United States Patent
Ofir et al.

(10) Patent No.: US 7,219,149 B2
(45) Date of Patent: May 15, 2007

(54) VERSATILE TERMINAL ADAPTER AND NETWORK FOR TRANSACTION PROCESSING

(75) Inventors: Jacob Ofir, Richmond Hill (CA); Mark A. Symmes, Schomberg (CA)

(73) Assignee: DW Holdings, Inc., Greenwood Village, CO (US)

( * ) Notice: Subject to any disclaimer, the term of this patent is extended or adjusted under 35 U.S.C. 154(b) by 144 days.

(21) Appl. No.: 10/461,175

(22) Filed: Jun. 12, 2003

(65) Prior Publication Data

US 2004/0128201 A1 Jul. 1, 2004

(51) Int. Cl.
*G06F 15/173* (2006.01)
*G06Q 20/00* (2006.01)

(52) U.S. Cl. .................. 709/224; 709/220; 705/21; 705/39

(58) Field of Classification Search .............. 705/16, 705/17, 18, 21, 24, 26, 220, 224; 709/239, 709/39

See application file for complete search history.

(56) References Cited

U.S. PATENT DOCUMENTS

| | | | |
|---|---|---|---|
| 4,755,940 | A | 7/1988 | Brachtl et al. |
| 4,808,803 | A | 2/1989 | Magier et al. |
| 4,972,463 | A | 11/1990 | Danielson et al. |
| 5,144,651 | A | 9/1992 | Cooper |
| 5,526,409 | A | 6/1996 | Conrow et al. |
| 5,535,334 | A * | 7/1996 | Merkley et al. ............ 709/239 |
| 5,541,925 | A | 7/1996 | Pittenger et al. |
| 5,546,541 | A | 8/1996 | Drew et al. |
| 5,619,559 | A | 4/1997 | Kennedy |
| 5,678,010 | A | 10/1997 | Pittenger et al. |
| 5,732,346 | A | 3/1998 | Lazaridis et al. |
| 5,778,173 | A | 7/1998 | Apte |
| 5,781,534 | A | 7/1998 | Perlman et al. |

(Continued)

FOREIGN PATENT DOCUMENTS

| | | |
|---|---|---|
| EP | 0 864 959 A2 | 9/1998 |
| WO | WO 01/20430 A2 | 3/2001 |
| WO | WO 01/80141 A1 * | 10/2001 |
| WO | WO 02/43014 A2 | 5/2002 |
| WO | WO 03/017600 A1 | 2/2003 |

OTHER PUBLICATIONS

Precidia Technologies, EtherDial -IP Connectivity Solution for Dial Terminals, Article, Retrieved on Apr. 22, 2003, pp. 1-3, Retrieved from the Internet: <URL:http://www.precidia.com/products/etherdial.html.

(Continued)

*Primary Examiner*—Saleh Najjar
*Assistant Examiner*—David Lazaro
(74) *Attorney, Agent, or Firm*—Townsend and Townsend and Crew LLP

(57) ABSTRACT

A terminal adapter, along with a value added network, is disclosed that interworks a plurality of terminals with a processing host to accomplish transaction processing. The terminals can use different protocols and typically incorporate card readers for completing financial or other types of transactions typically involving credit, debit, ATM or similar cards. The terminal adapter provides reliable and secure communication using a network based in part on the Internet as a primary form of communication. The terminal adapter also provides a secondary communication path in the event of a failure of the primary communication path, as well as automatic recognition of different terminal protocols, various security functions, error detection, and other network administration functions to ensure a flexible system and efficient transaction processing system.

21 Claims, 18 Drawing Sheets

U.S. PATENT DOCUMENTS

| | | | |
|---|---|---|---|
| 5,828,847 A * | 10/1998 | Gehr et al. ................. | 709/239 |
| 5,845,267 A | 12/1998 | Ronen | |
| 5,875,291 A | 2/1999 | Fox | |
| 6,058,250 A * | 5/2000 | Harwood et al. ........... | 709/227 |
| 6,061,557 A | 5/2000 | Lazaridis et al. | |
| 6,134,678 A * | 10/2000 | Mahalingam et al. ......... | 714/48 |
| 6,308,887 B1 | 10/2001 | Korman et al. | |
| 6,311,288 B1 * | 10/2001 | Heeren et al. ................. | 714/4 |
| 6,363,363 B1 | 3/2002 | Haller et al. | |
| 6,389,555 B2 | 5/2002 | Purcell et al. | |
| 6,415,341 B1 | 7/2002 | Fry, Sr. et al. | |
| 2002/0052966 A1 | 5/2002 | Isomura et al. | |
| 2002/0087724 A1 * | 7/2002 | Datta et al. ................. | 709/241 |
| 2002/0156683 A1 | 10/2002 | Stoutenburg et al. | |
| 2003/0088698 A1 * | 5/2003 | Singh et al. ................ | 709/239 |
| 2003/0185151 A1 * | 10/2003 | Kurosawa et al. ........... | 370/219 |
| 2004/0010711 A1 * | 1/2004 | Tang et al. ................. | 713/201 |

OTHER PUBLICATIONS

Precidia Technologies, Etherdial -Specifications, Article, pp. 1-2, Apr. 10, 2003; Retrieved on Apr. 22, 2003, Retrieved from the Internet: <URL: http://www.precidia.com/downloads/etherdial/SpecSheetEDial08CML69.pdf.

Precidia Technologies, Etherdial—IP Savings for Legacy Terminals, Article, pp. 1-2, Retrieved on Apr. 22, 2003; Retrieved from the Internet: <URL: http://www.precidia.com/downloads/etherdial/etherdial_brochure.pdf.

Precidia Technologies, Etherdial User Guide, Article, Sep. 20, 2002, Retrieved on Apr. 22, 2003, pp. 1-84 and A-I-E-2, Retrieved from the Internet: <URL: http://www.precidia.com/downloads/UserGuides/EtherDialUser_08-CML000003-03.pdf.

Precidia Technologies, Documentation, Article, Retrieved on Apr. 23, 2003, pp. 1-2, Retrieved from the Internet: <URL:http://www.precidia.com/technical_support/manuals.html.

Precidia Technologies, Com Port Control Compliance, Article, Retrieved on Apr. 22, 2003, pp. 1-2 of 07-CML000015; Retrieved from the Internet: <URL: http://www.precidia.com/downloads/HelpGuides/ComPortCntrl_07-CML000015.pdf.

Precidia Technologies, Connecting with Telnet, Article, Retrieved on Apr. 22, 2003, pp. 1-2 of 07-CML0000006; Retrieved from the Internet: <URL: http://www.precidia.com/downloads/HelpGuides/Telnet_07-CML000006.pdf.

Precidia Technologies, Connector Pin Assignments, Article, Retrieved on Apr. 22, 2003, pp. 1-4 of 07-CML000004; Retrieved from the Internet: <URL: http://www.precidia.com/downloads/HelpGuides/pinAssign_07-CML000004.pdf.

Precidia Technologies, Converting and Downloading Static Web Pages, Article, Retrieved on Apr, 22, 2003, pp. 1-8 of 07-CML000213; Retrieved from the Internet: <URL: http://www.precidia.com/downloads/HelpGuides/Cnvrt_DwnldWebPgs_07-CML000213.pdf.

Precidia Technologies, Remote Firmware Download, Article, Retrieved on Apr. 22, 2003, pp. 1-4 of 07-CML000009; Retrieved from the Internet: <URL: http://www.precidia.com/downloads/HelpGuides/RmteDwnld_07-CML000009.pdf.

Precidia Technologies, Modem Connection Control, Article, Retrieved on Apr. 22, 2003, pp. 1-10 of 07-CML000216; Retrieved from the Internet: <URL: http://www.precidia.com/downloads/HelpGuides/MdmConCntrl_07-CML000216.pdf.

Precidia Technologies, SNMP Settings and Compliance, Article, Retrieved on Apr. 22, 2003, pp. 1-18 of 07-CML000016; Retrieved from the Internet: <URL http://www.precidia.com/downloads/HelpGuides/SNMP_07-CML000016.pdf.

Precidia Technologies, Using HyperTerminal, Article, Retrived on Apr. 22, 2003, pp. 1-2 of 07-CML000005; Retrieved from the Internet: <URL http://www.precidia.com/downloads/HelpGuides/HyperTerm_07-CML000005.pdf.

Precidia Technologies Appendix: RFC 2217 Compliance, Article, Jun. 21, 2001, Retrieved on Apr. 22, 2003, pp. 1-2 of 07-CML000015; Retrieved from the Internet: <URL http://www.precidia.com/downloads/appendices/APX_RFC2217comport07CML15.pdf.

Precidia Technologies, Appendix: Ping Command, Article, Jun. 21, 2001, Retrieved on Apr. 22, 2003, pp. 1-2 of 07-CML000007; Retrieved from the Internet: <URL http://www.precidia.com/downloads/appendices/APX_Ping07CML7.pdf.

Precidia Technologies, Appendix: Working with Telnet, Article, Jun. 21, 2001, Retrieved on Apr. 22, 2003, pp. 1-2 of 07-CML000006; Retrieved from the Internet: <URL http://www.precidia.com/downloads/appendices/APX_Telnet07CML6.pdf.

Precidia Technologies, Appendix: Working with Hyperterminal, Article, Jun. 20, 2001, Retrieved on Apr. 22, 2003, pp. 1-3 f 07-CML000005; Retrieved from the Internet: <URL http://www.precidia.com/downloads/appendices/APX_HyperTerminal07CML5.pdf.

Precidia Technologies, Appendix: Pin Assignments, Article, Jun. 19, 2003, Retrieved on Apr. 22, 2003, pp. 1-3 of 07-CML000004; Retrieved from the Internet: <URL http://www.precidia.com/downloads/appendices/APX_Pin07CML4new.pdf.

Precidia Technologies, Appendix: Web Page Download, Article, Aug. 3, 2001, Retrieved on Apr. 22, 2003, pp. 1-5 of 07-CML000018; Retrieved from the Internet: <URL http://www.precidia.com/downloads/appendices/webpgdwnld_07CML18.pdf.

Precidia Technologies, Appendix: WebConvert, Article, Aug. 3, 2001, Retrieved on Apr. 22, 2003, pp. 1-5 of 07-CML000028; Retrieved from the Internet: <URL http://ww.precidia.com/downloads/appendices/webconvert07CML28.pdf.

Precidia Technologies, IP3201 -Low Cost IP Solutions for the Retail Payments Industry, Article, Retrieved on Apr. 22, 2003, pp. 1-3, Retrieved from the Internet: <URL:http://www.precidia.com/products/products6.htlm.

Precidia Technologies, IP3201-Specifications, Article, Retrieved on Apr. 22, 2003; Retrieved from the Internet: <URL http://www.precidia.com/downloads/ip3201/IP3201_Spec_03CML64b.pdf.

Precidia Technologies, IP3201 Datapac to IP Converter, Brochure, Retrieved on Apr. 22, 2003; Retrieved from the Internet: <URL http://www.precidia.com/downloads/ip3201/ip3201_brochure.pdf.

Precidia Technologies, IP3201 User Guide, Article, Sep. 20, 2002, Retrieved on Apr. 22, 2003, pp. 1-86 and A-1 -c-2 of 03-CML0000031-0300, Retieved from the Internet: <URL http://www.precidia.com/downloads/UserGuides/IP3201User_03-CML00031-03.pdf.

Precidia Technologies, Local Firmware Download, Article, Retrieved on Apr. 22, 2003, pp. 1-4 of 07-CML000008; Retrieved from the Internet: <URL http://www.precidia.com/downloads/HelpGuides/localDwnld_07-CML000008.pdf.

Precidia Technologies, Appendix: SNMP Compliance, Article, Jun. 21, 2001, Retrieved on Apr. 22, 2003, pp. 1-9 of 07-CML000016; Retreived from the Internet: <URL http://www.precidia.com/downloads/appendices/APX_SNMP07CML16.pdf.

Precidia Technologies, Appendix: Remote Software Download, Article, Jun. 20, 2001, Retrieved on Apr. 22, 2003, pp. 1-3 of 07-CML000009, Retrived from the Internet: <URL: http://www.precidia.com/downloads/appendices/APX_RemoteDwnld07CML9.pdf.

Precidia Technologies, The CellDial—Your Wireless Transaction Processing Solution, Article, Retrieved on Apr. 22, 2003, pp. 1-3, Retrieved from the Internet: <URL: http://www.precidia.com/products/celldial.html.

Precidia Technologies, Cell Dial Specifications, Article, Apr. 10, 2003; Retrieved on Apr. 22, 2003, pp. 1-2, Retrieved from the Internet: <URL: http://www.precidia.com/downloads/celldial/SpecSheetCDial.pdf.

Precidia Technologies, Cell Dial—Wireless POS Transaction Processing, Article, Retrieved on Apr. 22, 2003, pp. 1-2, Retrieved from the Internet: <URL: http://www.precidia.com/downloads/celldial/cell_dial_brochurefinal.pdf.

Precidia Technologies, Cell Dial User Guide, Article, Sep. 20, 2002, Retrieved on Apr. 22, 2003, pp. 1-92 and A-1-C-2, Retrieved from the Internet: <URL: http://www.precidia.com/downloads/UserGuides/CellDialUser_12-CML000209-03.pdf.

Precidia Technologies, Appendix: Local Software Download, Article, Jun. 20, 2001, Retrieved on Apr. 22, 2003, pp. 1-5 of 07-CML000008; Retrieved from the Internet: <URL http://www.precidia.com/downloads/appendices/APX_LocalDwnld07CML8.pdf.

Precidia Technologies, The Ether 3201-Low Cost IP Solutions for the Retail Payments Industry, Article, Retrieved on Apr. 22, 2003, pp. 1-3, Retrieved from the Internet: <URL:http://www.precidia.com/products/prodcuts3.html.

Precidia Technologies, Ether3201 Specifications, Article, Retrieved on Apr. 22, 2003, pp. 1-2, Retrieved from the Internet: <URL: http://www.precidia.com/downloads/Ether3201/Spec_Sheet_E3201_06CML63b.pdf.

Precidia Technologies, Ether3201 Datapac to IP Convertor, Article, Retrieved on Apr. 22, 2003, pp. 1-2, Retrieved from the Internet: <URL:http://www.precidia.com/downloads/Ether3201/ether3201_brochure.pdf.

Precidia Technologies, Application Note Connection to the Datapac Network, Article, Retrieved on Apr. 22, 2003, pp. 1-3, Retrieved from the Internet: <URL: http://www.precidia.com/downloads/app_notes/Application_Note_NRT.PDF.

Precidia Technologies, Ether 3201 User Guide, Article, Sep. 20, 2002, Retrieved on Apr. 22, 2003, pp. 1-82 and A-1-E-2, Retrieved from the Internet: <URL: http://www.precidia.com/downloads/UserGuides/Ether3201User_06-CML000027-03.pdf.

Precidia Technologies, Pin Assignments, Article, Jun. 19, 2002, Retrieved on Apr. 22, 2003, pp. 1-3 of 07-CML000004, Retrieved from the Internet: <URL: http://www.precidia.com/downloads/appendices/APX_Pin07CML4new.pdf.

Precidia Technologies, The Ether 232—Low Cost Serial to IP Connectivity, Article, Retrieved on Jul. 30, 2003, pp. 1-4, Retrived from the Internet: <URL: http://www.precidia.com/products/product1.html.

Precidia Technologies, Ether 232 Specifications, Article, Apr. 10, 2003, Retrieved on Jul. 30, 2003, pp. 1-2, Retrieved from the Internet: <URL: http://www.precidia.com/downloads/Ether232/specsheete232pl.pdf.

Precidia Technologies, Ether 232, Ether 485, Article, Retrieved on Jul. 30, 2003, p. 1-2; Retrieved from the Internet: <URL: http://www.precidia.com/downloads/remoteaccess_brochure.pdf.

Precidia Technologies, Application Note—Remote Router Administration, Article, Retrieved on Jul. 30, 2003; pp. 1-4, Retrieved from the Internet: <URL: http://www.precidia.com/downloads/app_notes/router_application.pdf.

Precidia Technologies, Benefits of Using Ether 232 to Systems Integrators, Article, Retrieved on Jul. 30, 2003, pp. 1-3, Retrieved from the Internet: <URL: http://www.precidia.com/downloads/Ether232/02-app000001-e232.pdf.

Precidia Technologies, Using the Ether 232 to Address Mulitlane Environments, Article, Retrieved on Jul. 30, 2003, pp. 1-4, Retrieved from the Internet: <URL: http://www.precidia.com/downloads/Ether232/02-APP000007-e232.pdf.

Precidia Technologies, Ether 232 User Guide, Article, May 26, 2003, Retrieved on Jul. 30, 2003, pp. 1-92, Retrieved from the Internet: <URL: http://www.precidia.com/downloads/UserGuides/Ether232User_02-CML000057-TEMP.pdf.

Precidia Technologies, Ether 422-Low Cost Serial to IP Connectivity, Article, pp. 1-4, Retrieved from the Internet: <URL: http://www.precidia.com/products/products4.html.

Precidia Technologies, Ether 422 Specifications, Article, Apr. 10, 2003, Retrieved on Jul. 30, 2003, pp. 1-2, Retrieved from the Internet: <URL: http://www.precidia.com/downloads/Ether422/spec_sheet_e422_05CML61_b.pdf.

Precidia Technologies, Ether 232, Ether 422, Ether 485—The Possibilities Are Endless, Article, Retrieved on Jul. 30, 2003, pp. 1-2, Retrieved from the Internet: <URL: http://www.precidia.com/downloads/remote.pdf.

Precidia Technologies, Using the Ether 422 For Garden Store At Multi-Lane Retailer, Article, Retrieved on Jul. 30, 2003, Retrieved from the Internet: <URL: http://www.precidia.com/downloads/Ether422/Genericwireless.pdf.

Precidia Technologies, Ether 422 User Guide, Article, Aug. 10, 2001, Retrieved on Jul. 30, 2003, pp. 1-72, http://www.precidia.com/downloads/Ether422/NEWUser_E422_05CML59.pdf.

Precidia Technologies, Ether 422 Installation and Configuration Guide, Article, Aug. 10, 2001, pp. 1-23, Retrieved on Jul. 30, 2003, Retrieved from the Internet: <URLL http://www.precidia.com/downloads/Ether422/NEWIC_E422_05CML58.pdf.

Precidia Technologies, Software Utilities, Article, Retrieved on Jul. 30, 2003, pp. 1-2, Retrieved from the Internet: <URL: http://www.precidia.com/products/software_utilities.html#comport.

Precidia Technologies, The Ether 485—Low Cost Serial to IP Connectivity, Article, pp. 1-4, Retrieved on Jul. 30, 2003, Retrieved from the Internet: <URL: http://www.precidia.com/products/product2.html.

Precidia Technologies, Ether 485 Specifications, Article, Apr. 10, 2003, Retrieved on Jul. 30, 2003, pp. 1-2, Retrieved from the Internet: <URL: http://www.precidia.com/downloads/Ether485/spec_sheete485_05CML62B.pdf.

Precidia Technologies, Using the Ether 485 to Address RF Environments, Article, Retrieved on Jul. 30, 2003, pp. 1-3, Retrieved from the Internet: <URL: http://www.precidia.com/downloads/Ether485/05-APP000009second.pdf.

Precidia Technologies, Ether 485 User Guide, Article, May. 26, 2003, Retreived on Jul. 30, 2003, pp. 1-86, Retrieved from the Internet: <URL: http://www.precidia.com/downloadsUserGuides/Ether485User_05-CML000055.pdf.

Precidia Technologies, Cell 232 Plus—A Unique Product That Transmits Serial Data to a Wireless Network, Article, Retrieved on Jul. 30, 2003, pp. 1-3, Retrieved from the Internet: <URL:http://www.precidia.com/products/cell232.html.

Precidia Technologies, Cell 232 Plus Specifications Article, April 10, 2003, Retrieved on Jul. 30, 2003, Retrieved from the Internet: <URL:http://www.precidia.com/downloads/cell232/Spec_sheet_Cell232_02CML90.PDF.

Precidia Technologies, Cell 232 Plus Remote Access Via Wireless Connection, Article, Retrieved on Jul. 30, 2003, pp. 1-2, Retrieved from the Internet; <URL: http://www.precidia.com/downloads/cell232/cell_232_brochurefinal.pdf.

Precidia Technologies, Cell 232 Plus User Guide, Article, Jul. 14, 2003, Retrieved on Jul. 30, 2003, pp. 1-88, Retrieved from the Internet: <URL: http://www.precidia.com/downloads/UserGuides/Cell232PlusUser_16-CML000210.pdf.

Precidia Technologies, The IP 232—Connect A Stand-Alone RS232 Serial Device Using Precidia's Internet Modem, Article, Retrieved on Jul. 30, 2003, pp. 1-3, Retrieved from the Internet: <URL:http://www.precidia.com/products/ip232.html.

Precidia Technologies, IP 232 Specifications, Article, Apr. 10, 2003, Retrieved on Jul. 30, 2003, pp. 1-2, Retrieved from the Internet: <URL: http://www.precidia.com/downloads/ip232/IP232Spec09CML2.pdf.

Precidia Technologies, IP 232 Remote Access, Article, Retrieved on Jul. 30, 2003, pp. 1-2, Retrieved from the Internet: <URL: http://www.precidia.com/downloads/ip232/ip232_brochure.pdf.

Precidia Technologies, IP 232 User Guide, Article, Sep. 20, 2002, Retrieved on Jul. 30, 2003, pp. 1-92, Retrieved from the Internet: <URL: http://www.precidia.com/downloads/UserGuides/IP232User_09-CML000005-04.pdf.

Precidia Technologies, Embedded Access Products, Article, Retrieved on Jul. 30, 2003, p. 1, Retrieved from the Internet: <URL: http://www.precidia.com/products/embedded.html.

Precidia Technologies, The Cypher—IP Access Processor, Article, Retrieved on Jul. 30, 2003, pp. 1-3, Retrieved from the Internet: <URL: http://www.precidia.com/products/product5.html.

Precidia Technologies, IP Access Processor, Article, Retrieved on Jul. 30, 2003, pp. 1-2, Retrieved from the Internet: <URL: http://www.precidia.com/downloads/cypher_asic/Cypher_brochure.pdf.

Precidia Technologies, Cypher IP Access Processor, Article, May 2003, Retrieved on Jul. 30, 2003, pp. 1-88, Retrieved from the Internet: <URL: http://www.precidia.com/downloads/cypher_asic/CypherDatasheet_04-DTS000205.pdf.

Netscreen Technologies: "Netscreen Security Appliances", Internet Article, Apr. 6, 2003, Retrieved from the Internet: URL:http://web.archive.org/web/20030406204802/www.netscreen.com/pdf/Appliances_datasheet.pdf>, retrieved on Aug. 18, 2004.

Netscreen Technologies: "Netscreen-Global PRO Security Management Systems", Internet Article, Apr. 7, 2003, Retrieved from the Internet: URL:http://web.archive.org/web/20030407145938/www.netscreen.com/pdf/NSGlobal_datasheet.pdf>, retrieved on Aug. 18, 2004.

Datawire Communication Networks, Inc.: "Discover the Datawire VXN", Internet Article, Jun. 9, 2003, Retrieved from the Internet: URL:http://web.archive.org/web/20030609022947/http://datawire.com/pdfs/Discover_the_VXN.pdf>, retrieved on Aug. 18, 2004.

Datawire Communication Networks, Inc.: "The VXN Micronode", Internet Article, Jul. 28, 2003, Retrieved from the Internet: URL:http://web.archive.org/web/20030728045952/http://www.datawire.com/pdfs/mNode_Infosheet.pdf>, retrieved on Aug. 18, 2004.

International Search Report from International Application No. PCT/CA2004/000848 dated Sep. 9, 2004.

Datawire Communication Networks, Inc.: The VXN Micronode, Internet Article, published on Apr. 29, 2003 and Jul. 28, 2003, Retrieved Aug. 18, 2004 from Internet Site http://web.archive.org/web/20030429155400/http://www.datawire.com/pdfs/mNode_Infosheet.pdf and http://web.archive.org/web/2003728045952/http://www.datawire.com/pdfs/mNode_Infosheet.pdf.

International Preliminary Report from International Canadian Application No. PCT/CA2004/000848 dated Sep. 19, 2005.

SPACENET, Connexstar VSAT Dial Backup Service, Retrieved Aug. 15, 2005 from Internet Site www.spacenet.com, pp. 1-2 (no admission that this constitutes prior art).

SPACENET, Spacenet Prysm: All-In-One Networking Platform, Retrieved Aug. 15, 2005 from Internet Site www.spacenet.com, pp. 1-2 (no admission that this constitutes prior art.

* cited by examiner

Normal Mode of Operation

| Parameter Number | Description | Type | Size (bytes) |
|---|---|---|---|
| 1 | Configuration version | Long | 4 |
| 2 | Config Fetch Interval | Integer | 2 |
| 3 | Max Skip Config Fetch | Integer | 2 |
| 4 | Connection Register<br>Bit 0 – Ethernet<br>Bit 1 – PPP<br>Bit 2 – PPPoE | Byte | 1 |
| 10 | Binary image name | String | 20 |
| 11 | Binary image size | Long | 4 |
| 12 | Binary image CRC | Integer | 2 |
| 20 | Service Discovery Host Name 1 | String | 32 |
| 21 | Service Discovery Host Name 2 | String | 32 |
| 22 | Service Discovery Port 1 | Integer | 2 |
| 23 | Service Discovery Port 2 | Integer | 2 |
| 30 | Primary ISP Number | String | 24 |
| 31 | Primary ISP Username | String | 15 |
| 32 | Primary ISP Password | String | 15 |
| 33 | Primary Aux Wait String | String | 15 |
| 34 | Primary PPP Register<br>Bit 0 – Use Login<br>Bit 1 – Use Aux Wait String | Byte | 1 |
| 40 | Backup ISP Number | String | 24 |
| 41 | Backup ISP Username | String | 15 |
| 42 | Backup ISP Password | String | 15 |
| 43 | Backup Aux Wait String | String | 15 |
| 44 | Backup PPP Register<br>(see Primary PPP Register above) | Byte | 1 |
| 50 | FTP URL | String | 32 |
| 51 | FTP Port | Integer | 2 |
| 52 | FTP Username | String | 15 |
| 53 | FTP Password | String | 15 |

Figure 13B

VERSATILE TERMINAL ADAPTER AND NETWORK FOR TRANSACTION PROCESSING

FIELD OF THE INVENTION

This invention generally relates to terminal adapters for terminals originating financial transactions, including credit/debit card readers, automatic teller machines, and point of sale terminals. Specifically, terminals using various access protocols interact with a transaction oriented value added network using a versatile terminal adapter facilitating interaction of the terminal with a host processor, wherein the host is also connected to the network. In one embodiment, the terminal adapter uses a wide area network, such as the Internet, as a primary means of accessing the value added network, and uses dial-up telephone service as a secondary means of accessing the value added network in the event of failure of the primary communication means. A network operations center manages the transaction oriented value added network for optimal performance.

BACKGROUND OF THE INVENTION

Electronic real-time transaction processing is common in many industries, including retail sales, inventory control, and healthcare. Businesses utilize devices such as card readers, including those reading magnetically encoded cards, to increase productivity and accuracy of various types of transactions. A common application is the use of credit cards for purchasing goods and services in retail sales. Many retailers have deployed automated card readers to facilitate credit and debit card authorization processing by store personnel. Not only do automated card readers provide greater accuracy than manually keying information at time of purchase, they offer greater speed, convenience, and accuracy. Today, it is common for each point-of-sale (POS) terminal to have an integrated card reader or have the terminal connected to a nearby card reader.

Typically, a card reader communicates with a host financial transaction processor using a dedicated phone line. The card reader incorporates a standard modem implemented by a single, low-cost integrated circuit based on modem standards such as V.22, V.22 bis, or V.34. The card reader dials a programmed telephone number (usually local or toll-free) and establishes a telephone connection via a network with the host processor. The card reader transmits the transaction information including the card number, a transaction number, and purchase amount to a host. The host processor accepts or declines the transaction and responds by returning an authorization number. This type of transaction typically occurs quickly as it is desirable to minimize delay and increase customer satisfaction.

Many businesses have a single point-of-sale terminal, and thus require a phone line for handling card authorizations. This is usually in addition to a voice telephone line, used by the business, since the phone line is usually dedicated for the card reader. If the telephone line is shared with a telephone for voice communication, then operation becomes inconvenient, often resulting in delaying card authorizations or voice calls. For businesses having multiple POS terminals, a plurality of telephone lines are dedicated to the card readers, often on a shared basis. While sharing telephone lines among card readers allows some cost savings, this still may result in delays for a given card reader, depending on the current card authorization volume and the number of telephone lines. For a growing business with an increasing volume of card transactions or increase in the number of card readers, constantly monitoring and determining when to add new phone lines is difficult and distracting to the core business functions of the retailer. However, use of dedicated phone lines typically does provide a high degree of reliability and security.

Many businesses now have Internet access to supplement various business functions. Internet access is often provided to various workers at personal computers using an internal local area network (LAN) providing gateway access to an Internet Service Provider (ISP). The physical communication facility between the LAN and the ISP may be of various types, including digital private line, optical fiber, ISDN, DSL, cable modem, wireless, satellite, etc. Typically, digital access arrangements provide higher data communication speeds compared to dial-up connections. Using a LAN to access the Internet allows multiple users to access the Internet at the same time. While simultaneous usage may slow down response times, one user does not 'block' access by another, as is the case when a single telephone line is shared by multiple users or devices. Further, the cost of accessing the Internet does not necessarily require additional fees for each simultaneous user accessing the Internet. In contrast, simultaneous access via telephone lines requires a plurality of telephone lines, each of which has a discrete incremental cost.

If retailers could configure their card readers to utilize the Internet for accessing the host processor, the telephone lines dedicated for the card readers would not be required, thus reducing costs for the retailers. However, the use of separate telephone lines does provide the advantage of a reliable and redundant communication architecture. Replacing all the telephone lines with a single Internet access arrangement provides a single point of communication failure rendering all the card readers in the retailer's location non-functional if Internet access is unavailable. The potential for lost profits, even for a relatively short outage, can more than justify the higher cost of using separate telephone lines. Consequently, it would be desirable to have the advantages of Internet access while retaining the reliability and security of a dial-up connection.

U.S. Pat. No. 5,526,409 discloses the use of a second telephone line that can be used as a secondary means of communication in the event the primary telephone line or modem is inoperable. However, using a single telephone line as the primary communication facility limits the data communication speed for transmitting data and limits the destination to a single host. Nor does the patent disclose automatically switching to the second telephone line or automatically switching back to the primary telephone line.

U.S. Pat. No. 5,778,173 discloses using the Internet by a personal computer to facilitate a financial transaction, such as a purchase. However, the complete transaction is not carried out using the Internet; a portion of the transaction conveying sensitive information is sent using a modem on a dial-up telephone connection. This arrangement still requires a dedicated phone line for each terminal and increases cost.

Therefore, what is needed is a system for using existing card reader terminals for accessing a host financial processor using an inexpensive, reliable, and secure transaction processing network while providing backup communication to ensure reliable and secure transaction processing.

BRIEF SUMMARY OF THE INVENTION

Generally described, the present invention interworks a terminal, typically incorporating a magnetic card reader, with a host processor by using a terminal adapter operating in conjunction with a network. The terminal adapter and network provide various value added services, including synchronization, error detection, security, backup communication, and authentication to achieve fast, reliable, low cost, and efficient transaction processing. Various embodiments of adapting existing terminals or personal computer based terminals are disclosed.

According to one aspect of the invention, a terminal adapter operating in conjunction with a network is provided for interworking a terminal to a host where the terminal adapter incorporates a processor to receive a first transaction request message from the terminal and interwork the message to the network using a second transaction request message. The network conveys the transaction to the host and interworks the message to a protocol used by the host. The response from the host is similarly conveyed back to the terminal. The terminal adapter in coordination with the network provides services including: synchronization, authentication, error detection, encryption, backup communication capability, automatic recognition of various terminal protocols and host addresses, automatic determination of network addresses to obtain configuration parameters, and the ability to automatically download new software.

According to another aspect of the invention, various embodiments of the terminal adapter/terminal are disclosed, including a software version in which functions associated with the terminal adapter are accomplished by loading software into a computer, such as a personal computer based terminal having existing communication capability with a network.

According to one aspect of the invention, a network node is provided for interworking a terminal adapter to a host. The network node incorporates a processor to receive a transaction request message from the terminal adapter and ensure the request is synchronized, encrypted, and error free and to relay the message to another network node and to a host processor. The response from the host is similarly conveyed back to the terminal. The network node in coordination with the terminal adapter provides services including: synchronization, authentication, error detection, encryption, and downloading of addresses, parameters and software to the terminal adapter.

According to another aspect of the invention, a method is disclosed for interworking transaction messages by a terminal adapter wherein the messages originated from a terminal are interworked with a network for processing by a host. The method includes: receiving a first message from the terminal, determining the protocol and host destination, and mapping the first message to a second message to a network interface. The method includes ensuring synchronization between the terminal adapter and network, encrypting and decrypting messages, switching over to a backup communication path as required, authenticating the terminal adapter to the network, discovering service address information and new configuration parameters, and downloading software as required.

According to another aspect of the invention, a network operation center is disclosed for maintaining information associated with each terminal, including primary and secondary communication path status, operational status, software version indicators, parameter file version indicators, and various service related address information. The network operations center may further initiate communication to a defined location, in a defined manner, based on a defined status condition.

BRIEF DESCRIPTION OF THE SEVERAL VIEWS OF THE DRAWINGS

Figure 1:
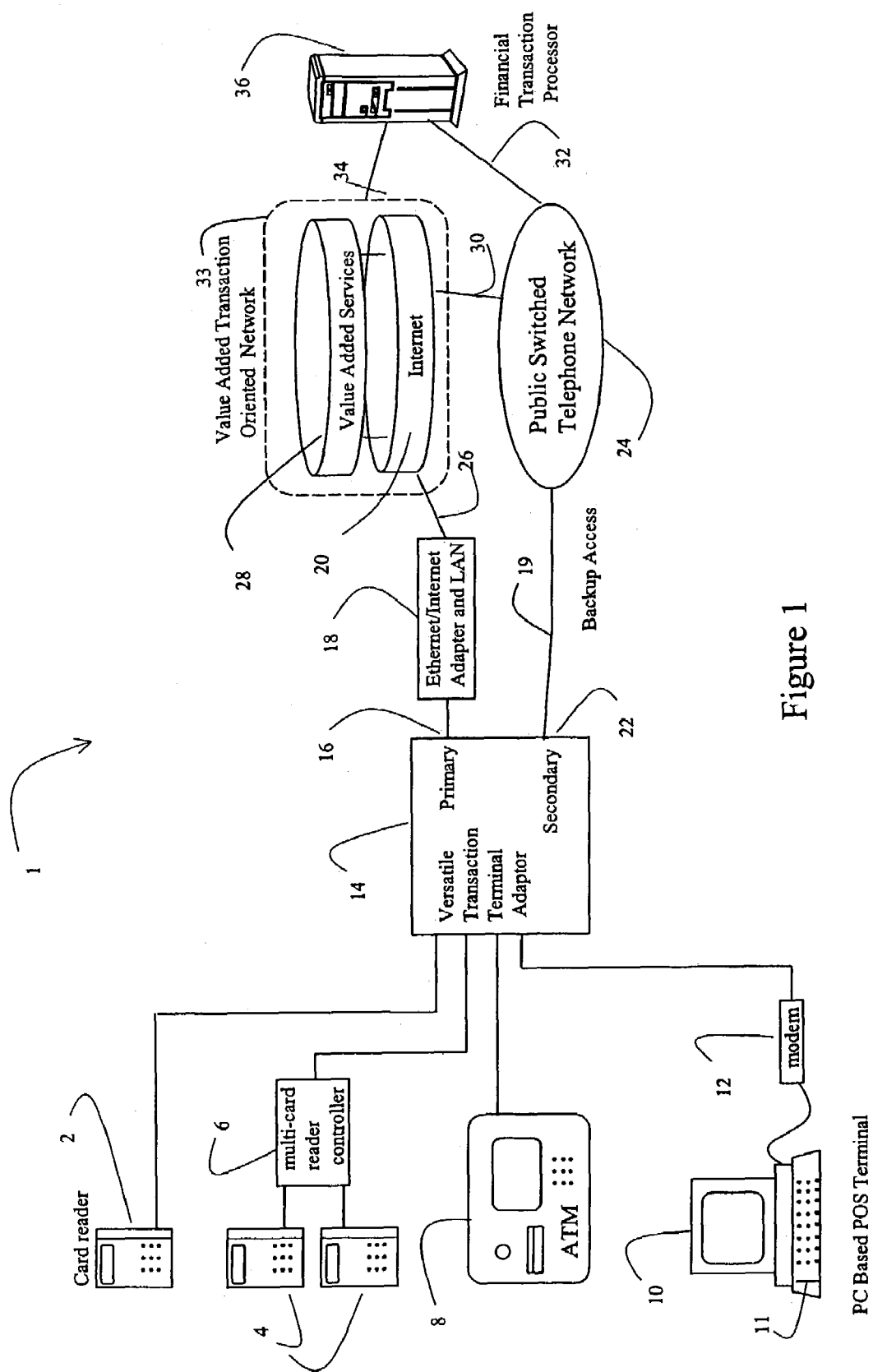

Having thus described the invention in general terms, reference will now be made to the accompanying drawings, which are not necessarily drawn to scale, and wherein:

FIG. 1 illustrates one embodiment of the system in which the versatile Terminal Adapter operates according to the principles of one embodiment of the present invention.

Figure 2:
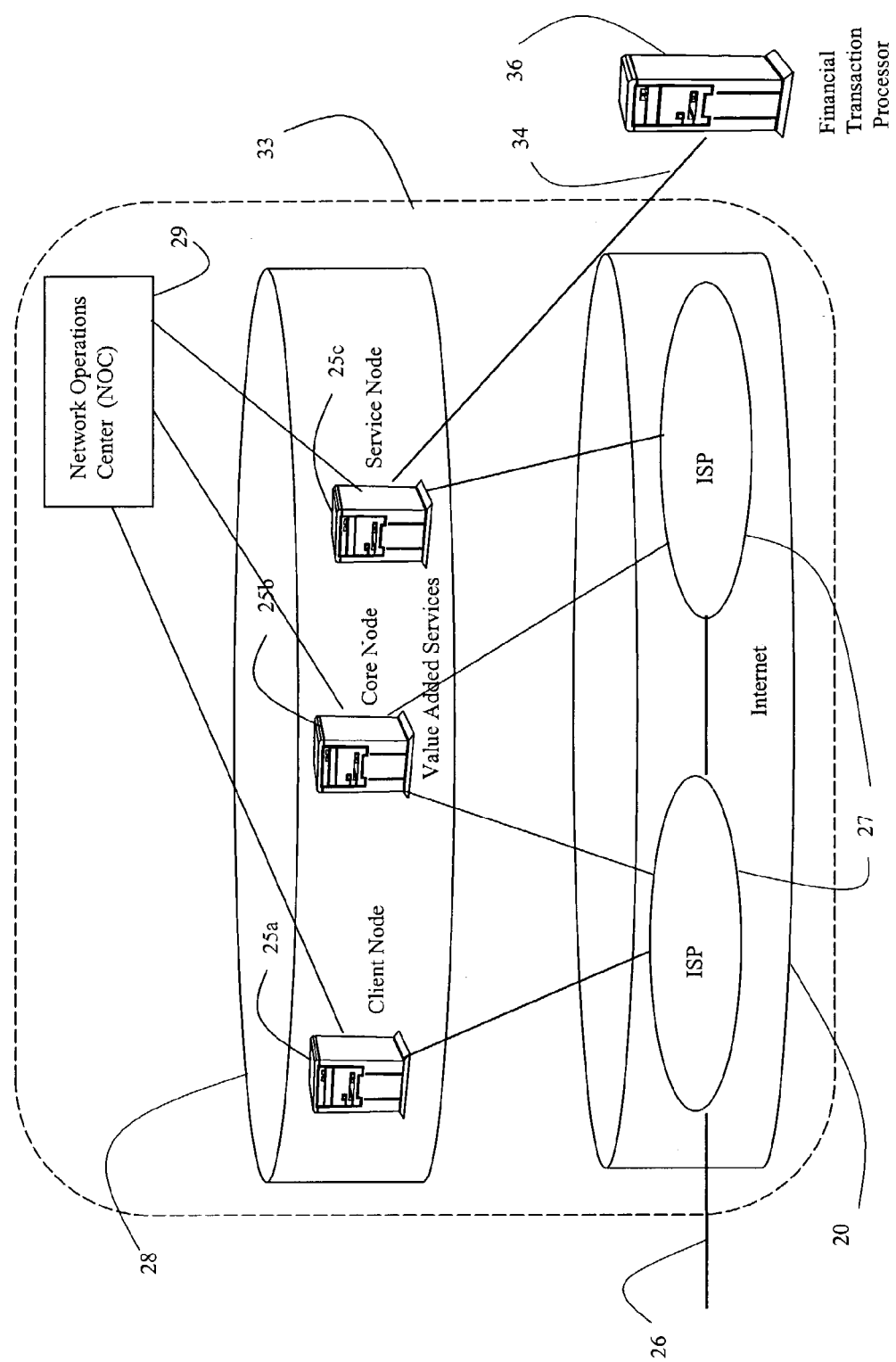

FIG. 2 further elaborates on one embodiment of the invention involving the Value Added Network according to the principles of one embodiment of the present invention.

Figure 3:
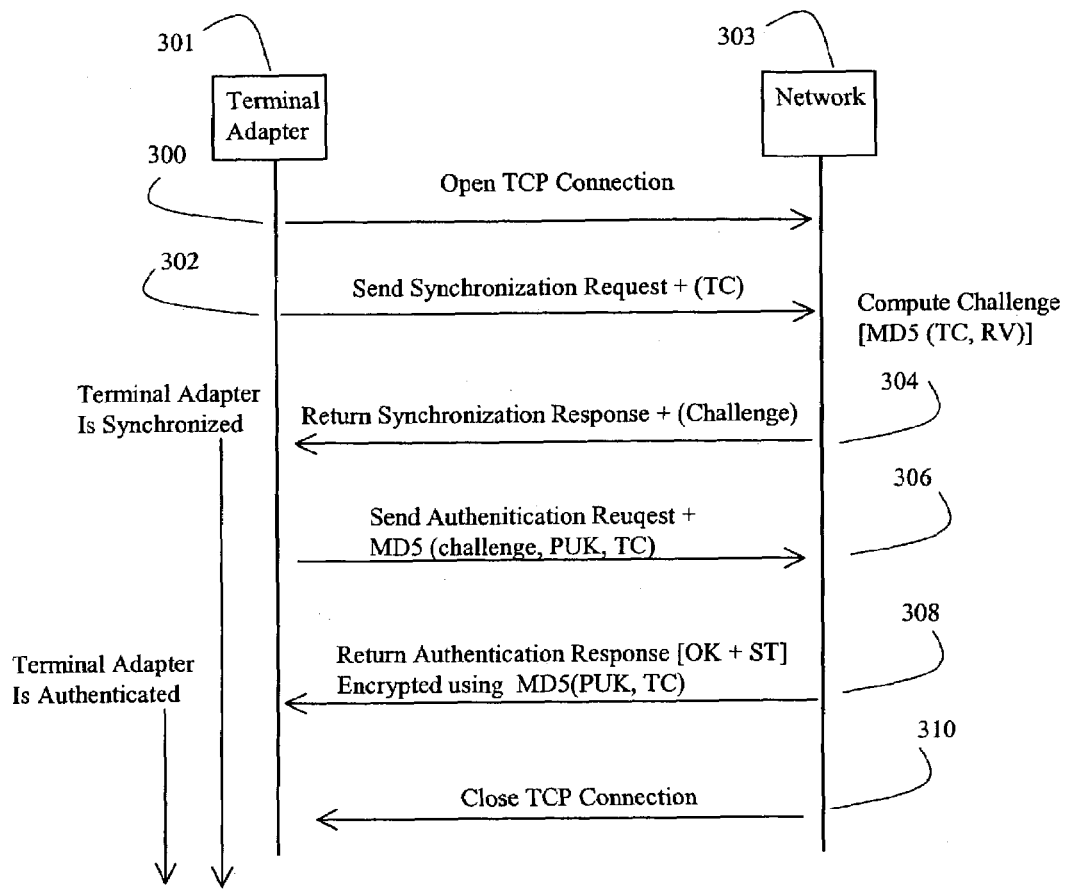

FIG. 3 illustrates the pre-transaction transfer procedures for the Terminal Adapter according to the principles of one embodiment of the present invention.

Figure 4:
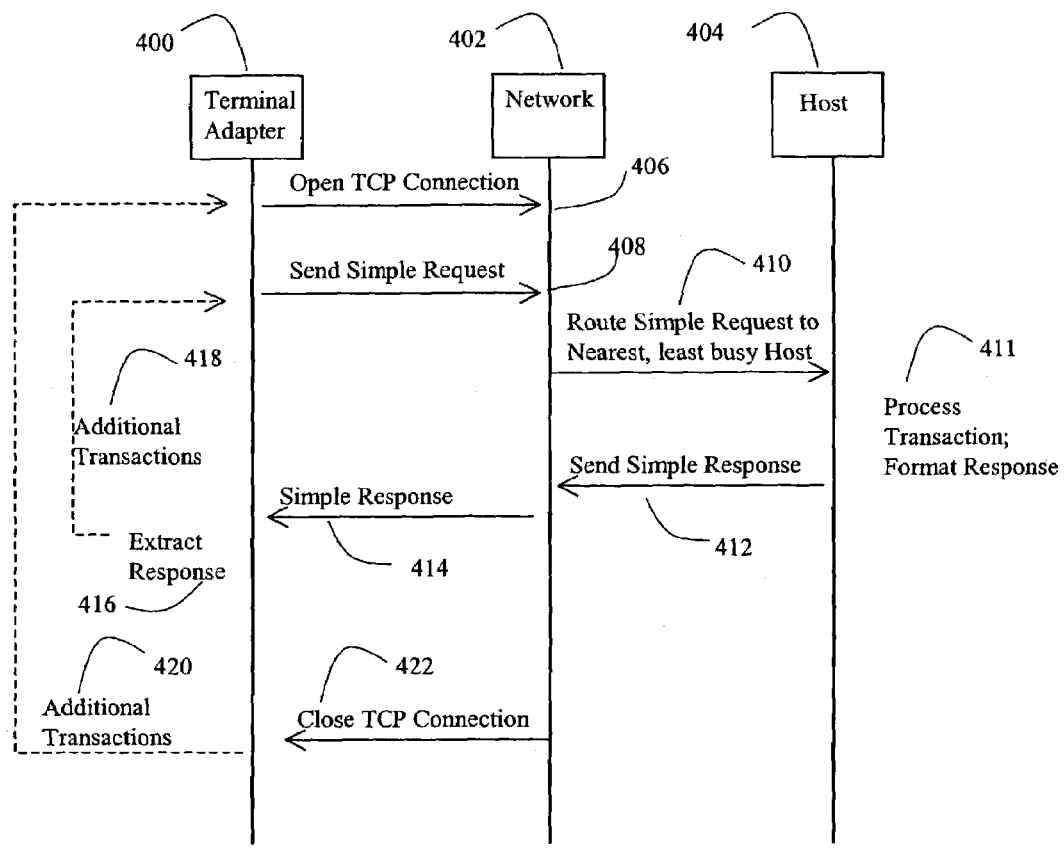

FIG. 4 illustrates a Simple Transaction message exchange according to the principles of one embodiment of the present invention.

Figure 5:
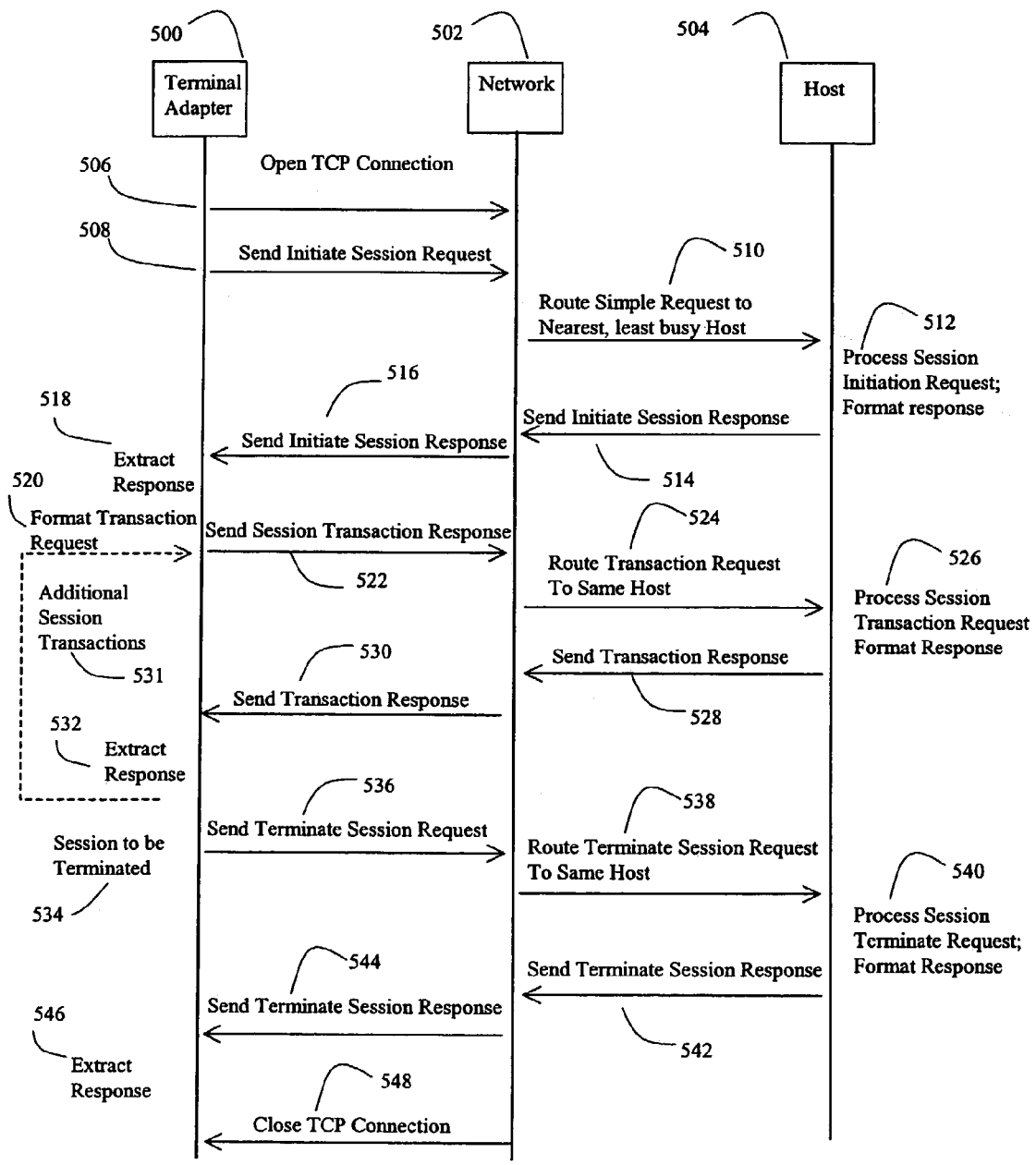

FIG. 5 illustrates a Session Transaction message exchange according to the principles of one embodiment of the present invention.

Figure 6:
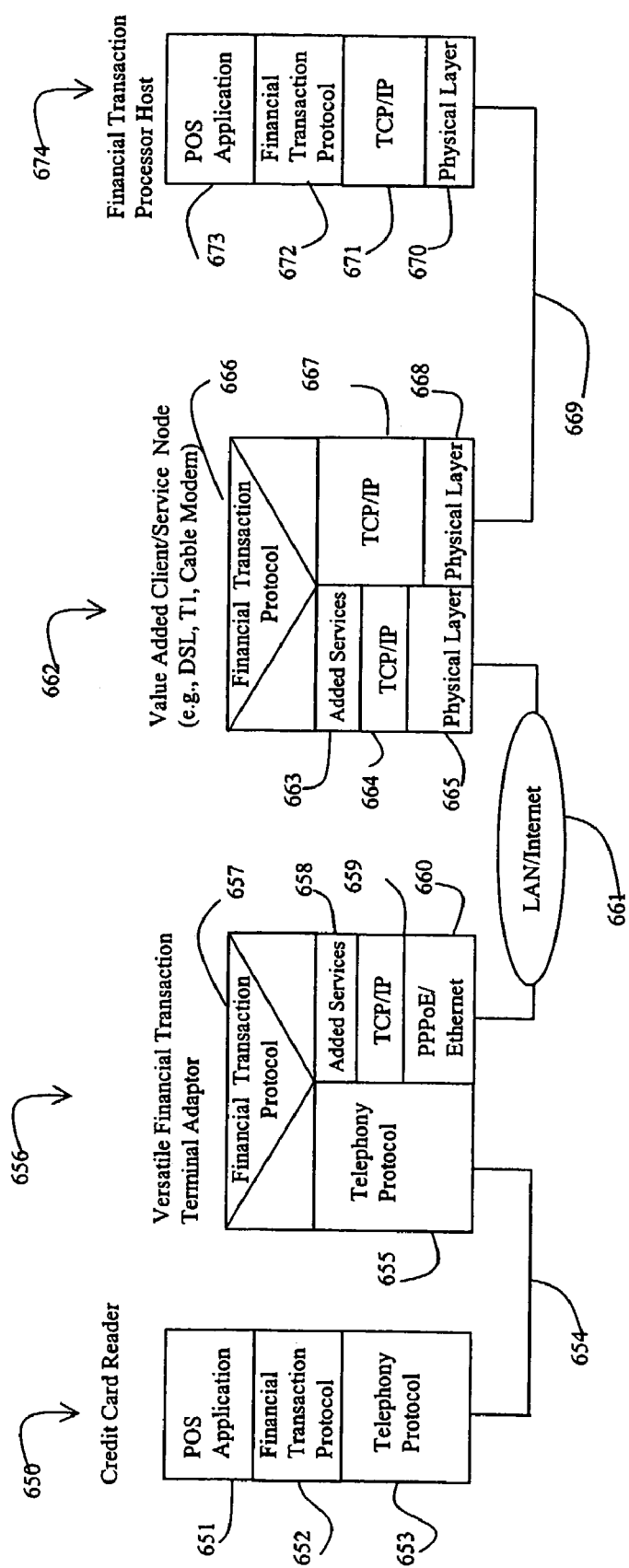

FIG. 6 illustrates the protocol architecture for one embodiment of the Terminal Adapter using the primary communication path according to the principles of one embodiment of the present invention.

Figure 7:
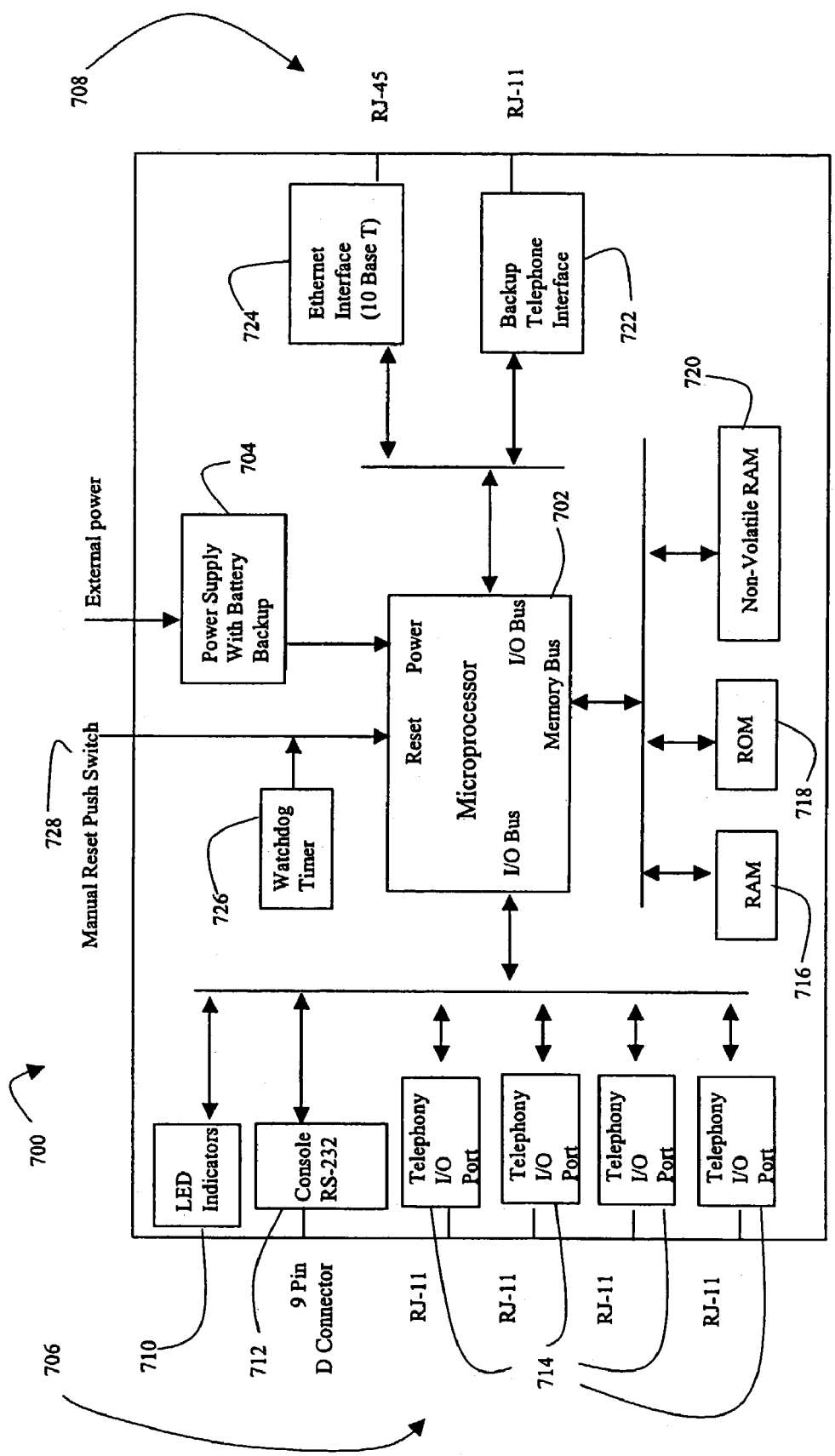

FIG. 7 illustrates various hardware components associated with one embodiment of the Terminal Adapter according to the principles of one embodiment of the present invention.

Figure 8:
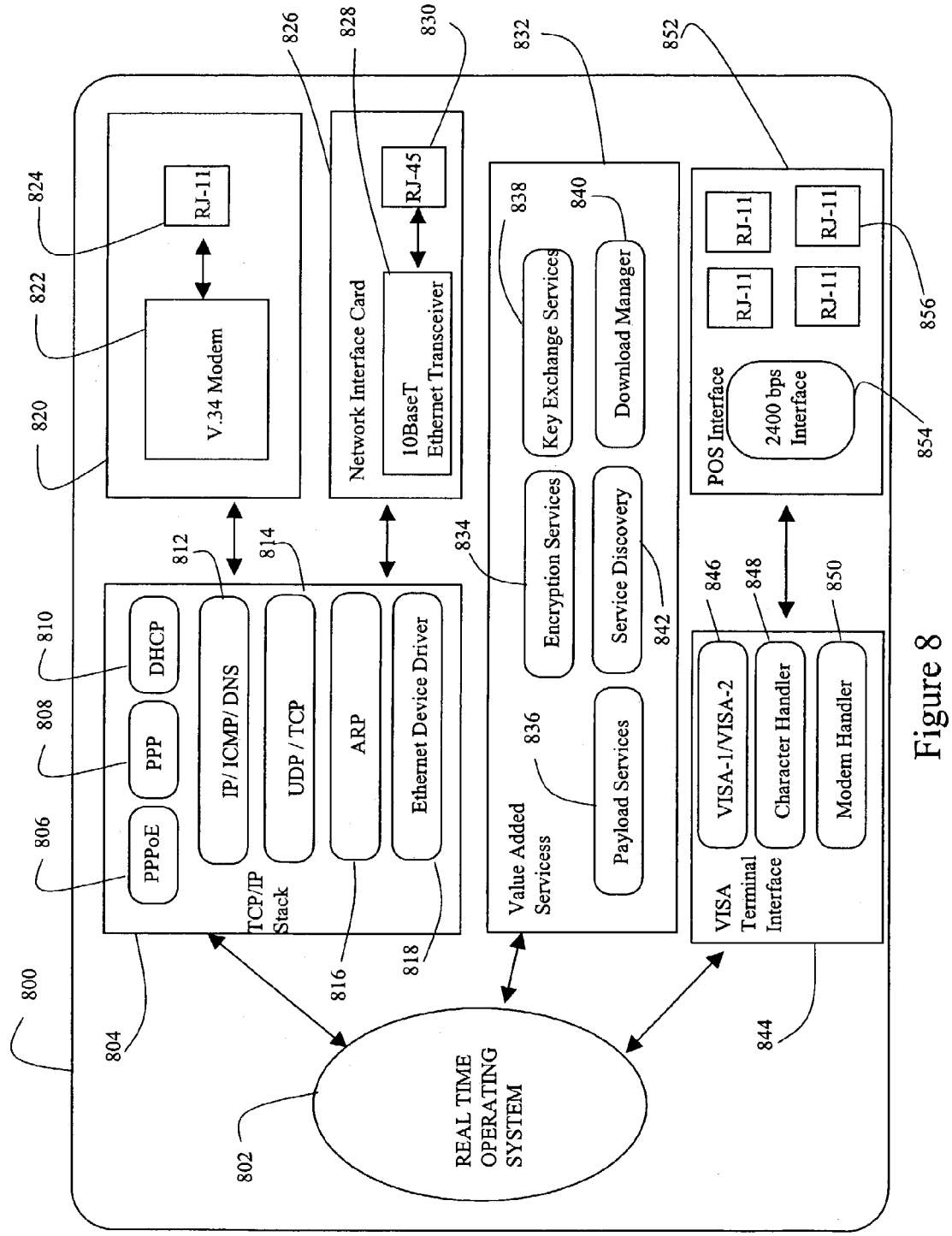

FIG. 8 illustrates various software components associated with one embodiment of the Terminal Adapter according to the principles of the present invention.

Figure 9A:
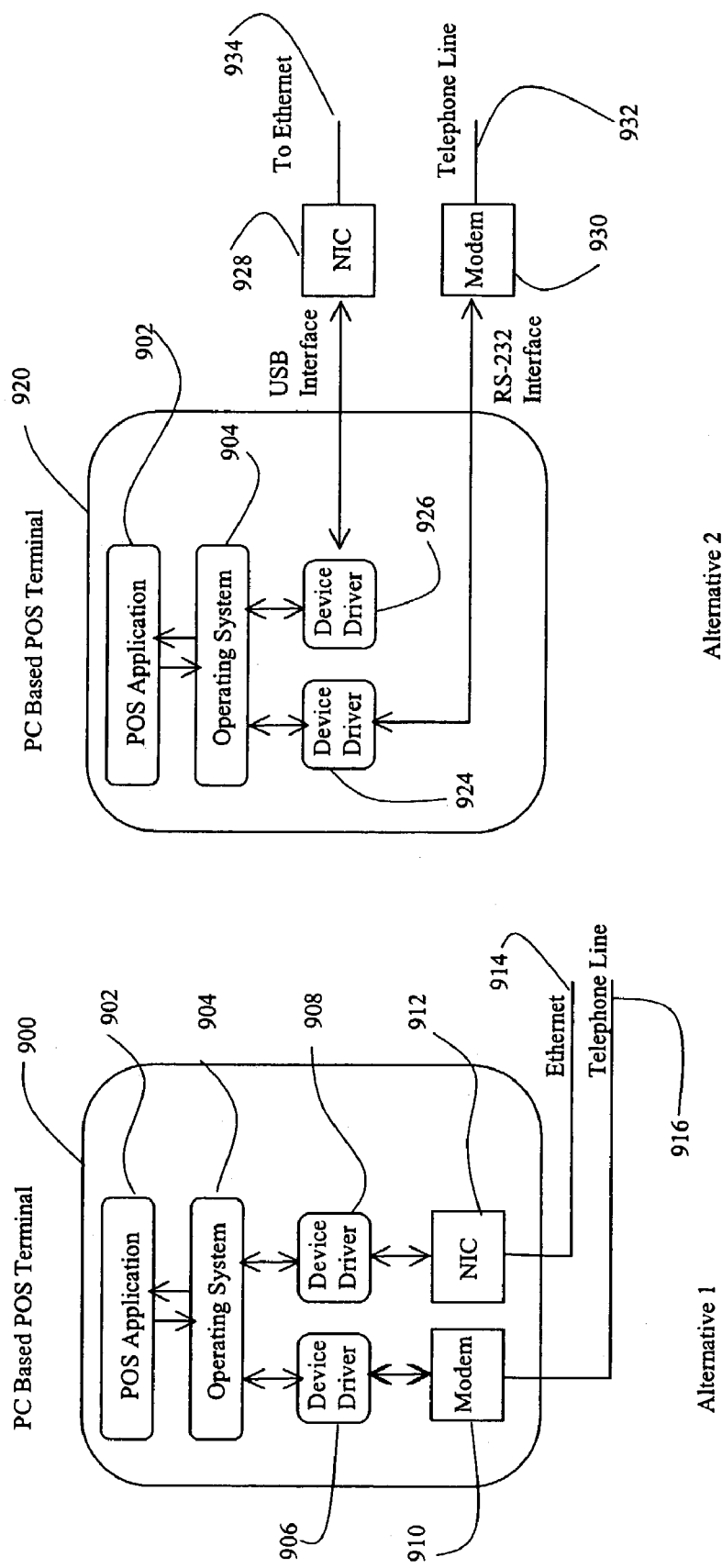
Figure 9B:
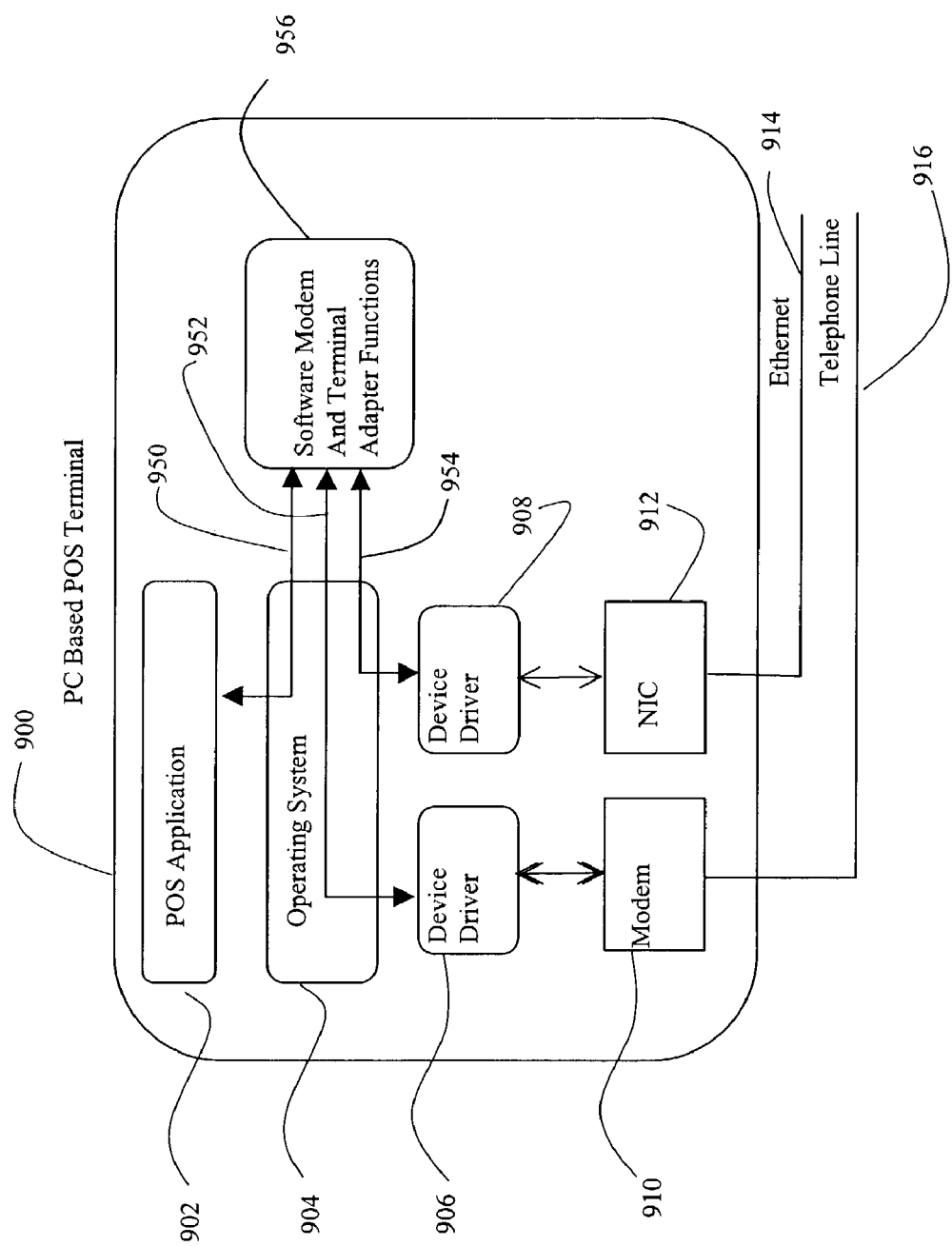

FIGS. 9A–9B illustrate various software related embodiments of the functions according to the principles of one embodiment of the present invention.

Figure 10:
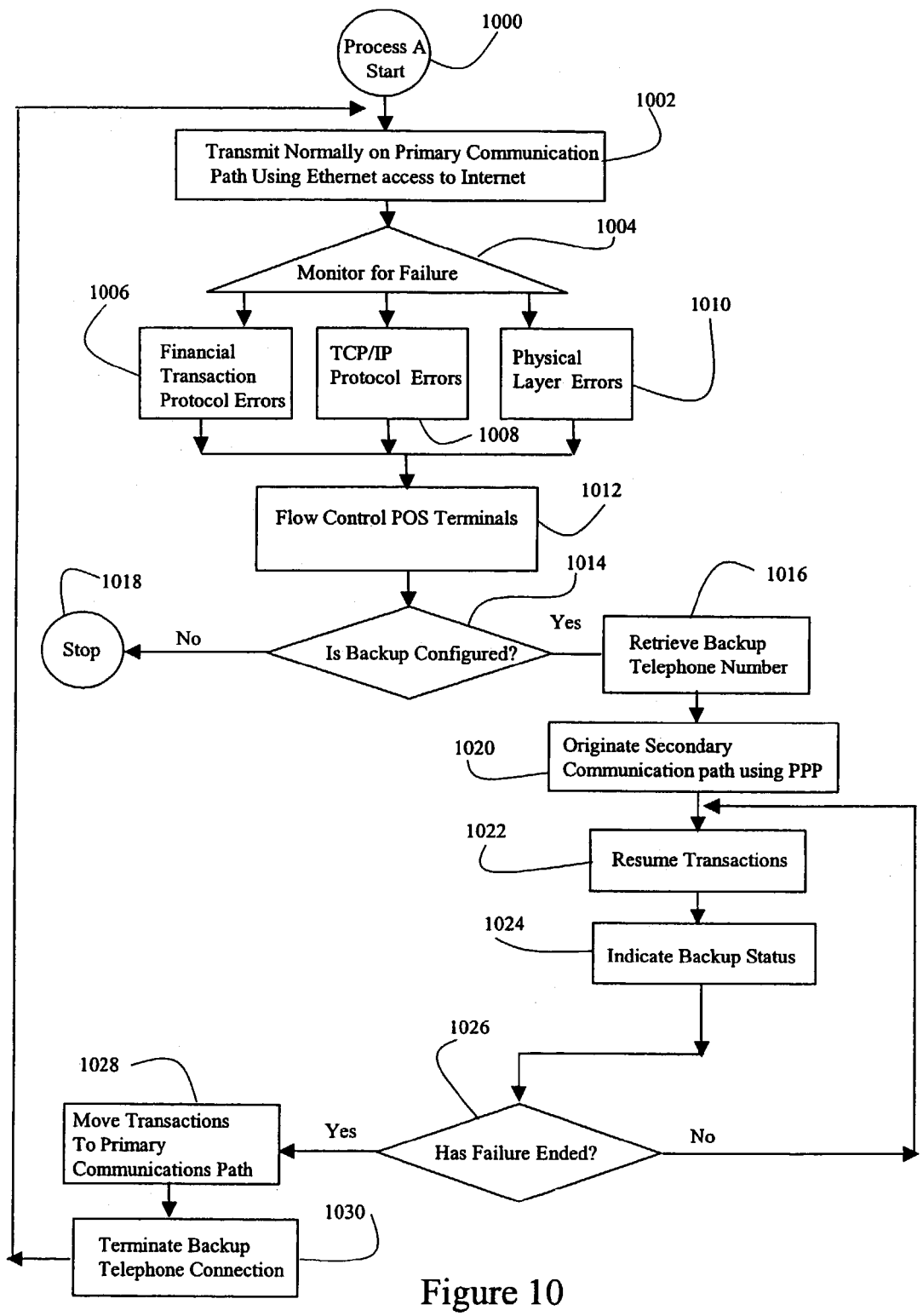

FIG. 10 illustrates a flowchart for switching from the primary to secondary communication path (and vice versa) according to the principles of one embodiment of the present invention.

Figure 11:
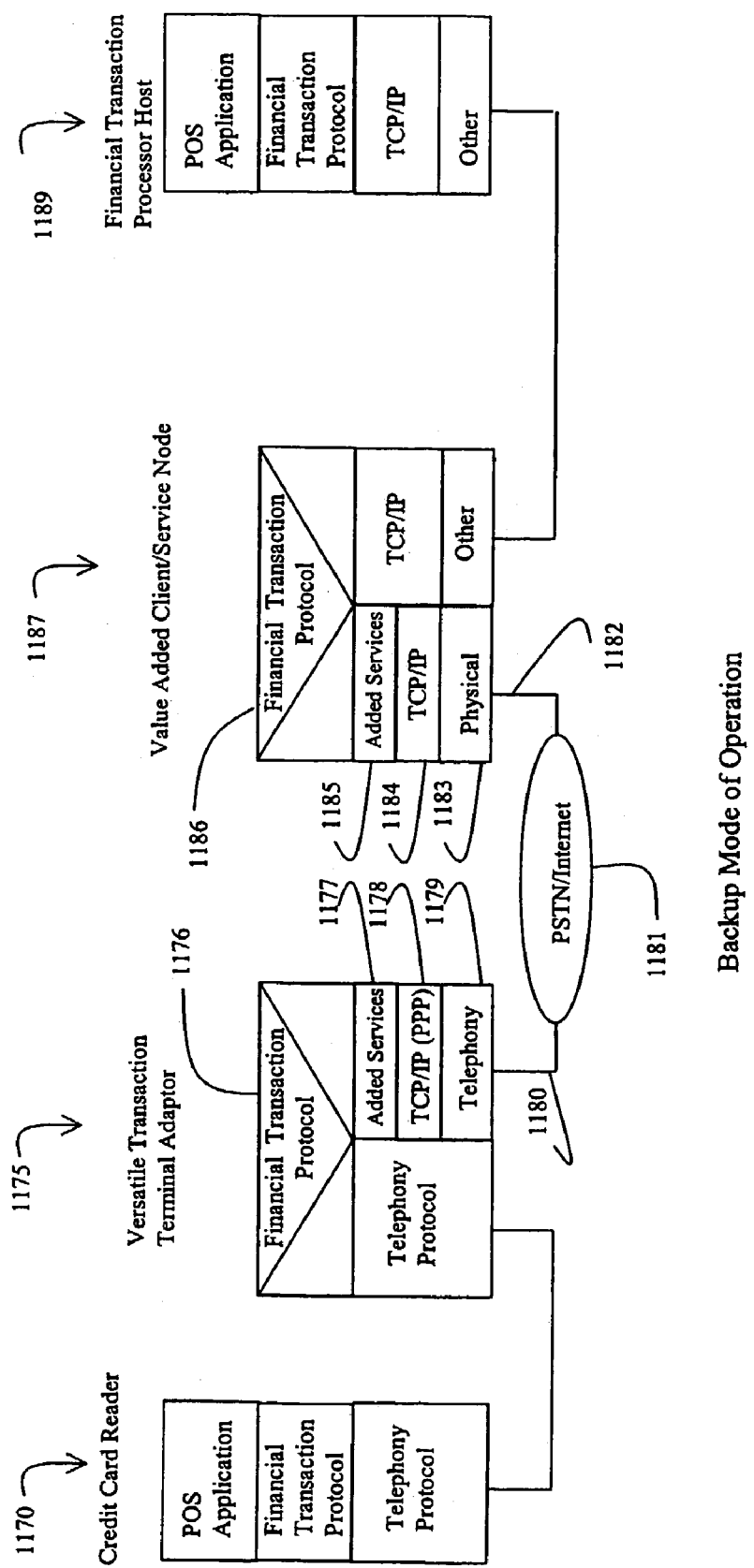

FIG. 11 illustrates the protocol stacks for one embodiment of the Terminal Adapter using the secondary communication path according to the principles of one embodiment of the present invention.

Figure 12A:
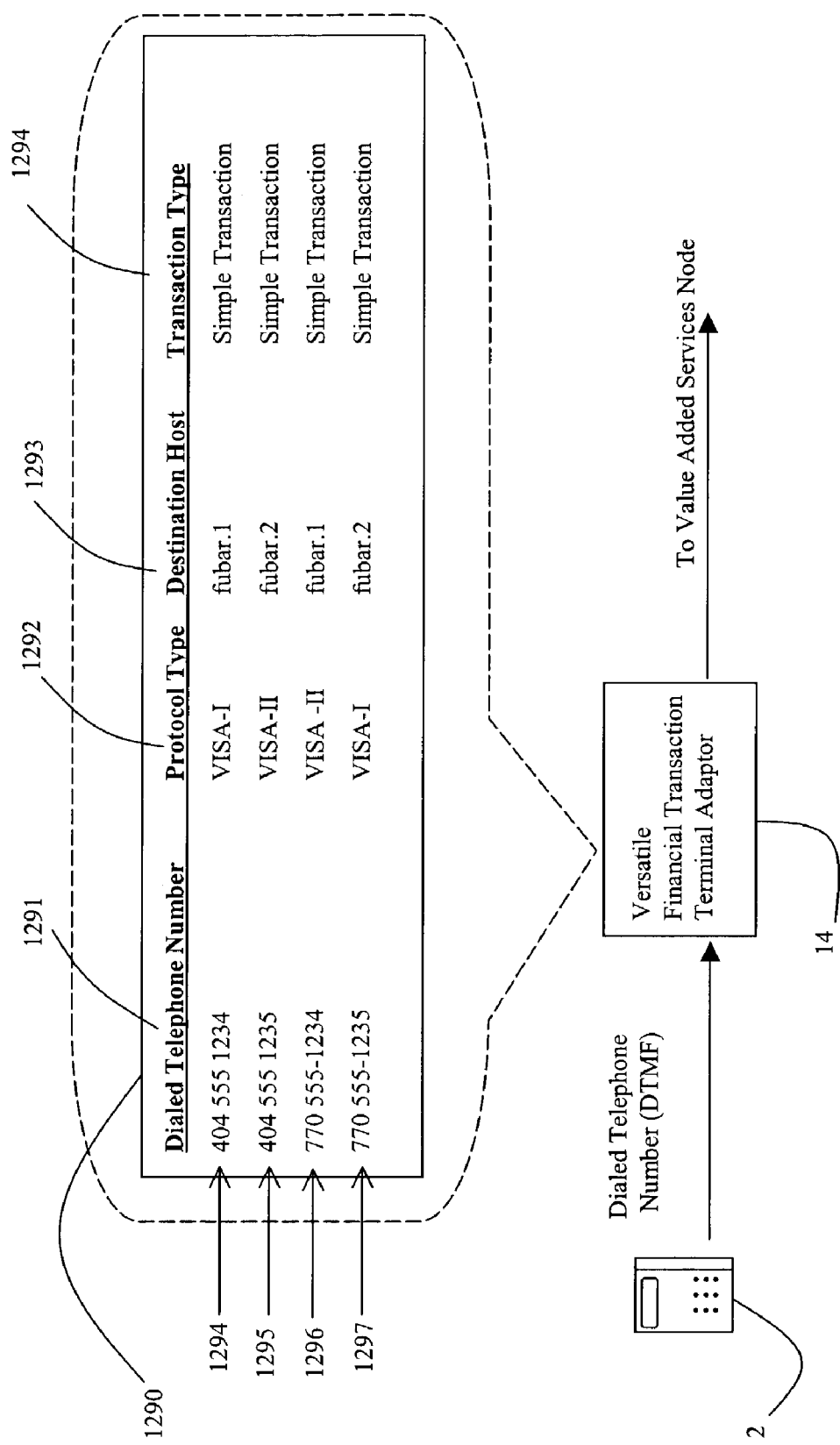
Figure 12B:
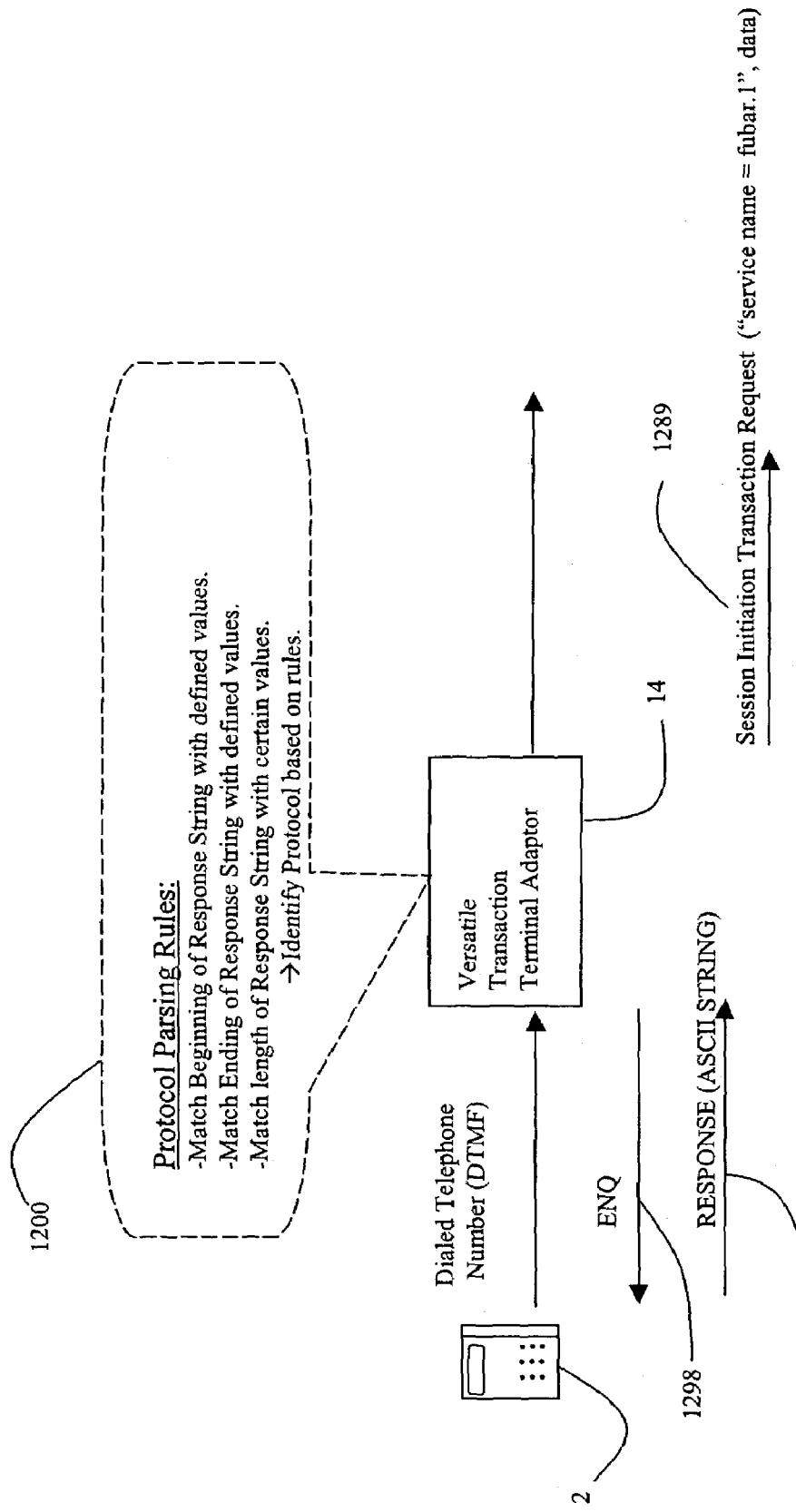
Figure 12C:
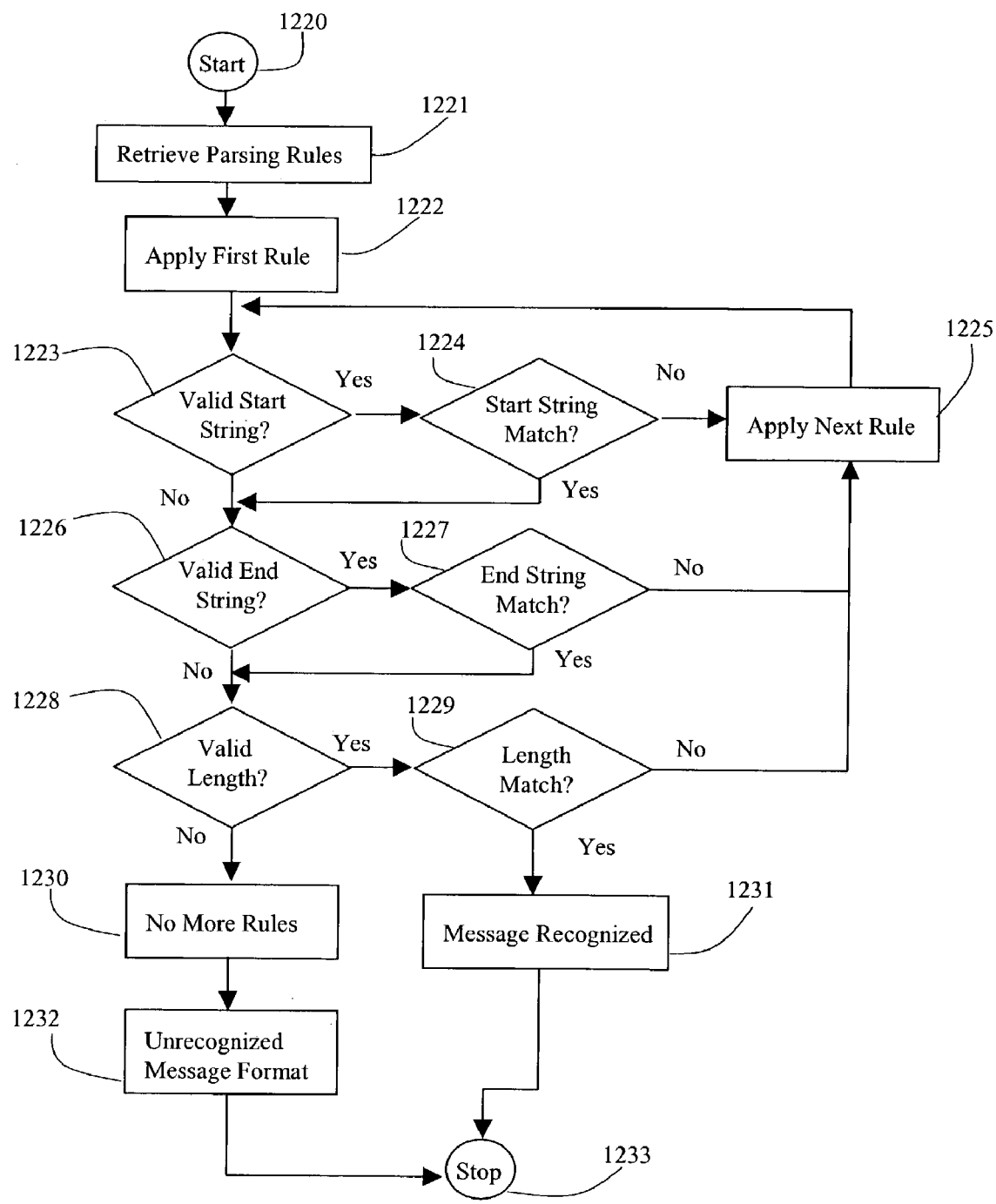

FIGS. 12A–12C illustrate embodiments of the Terminal Adapter automatically selecting a terminal protocol according to the principles of one embodiment of the present invention.

Figure 13A:
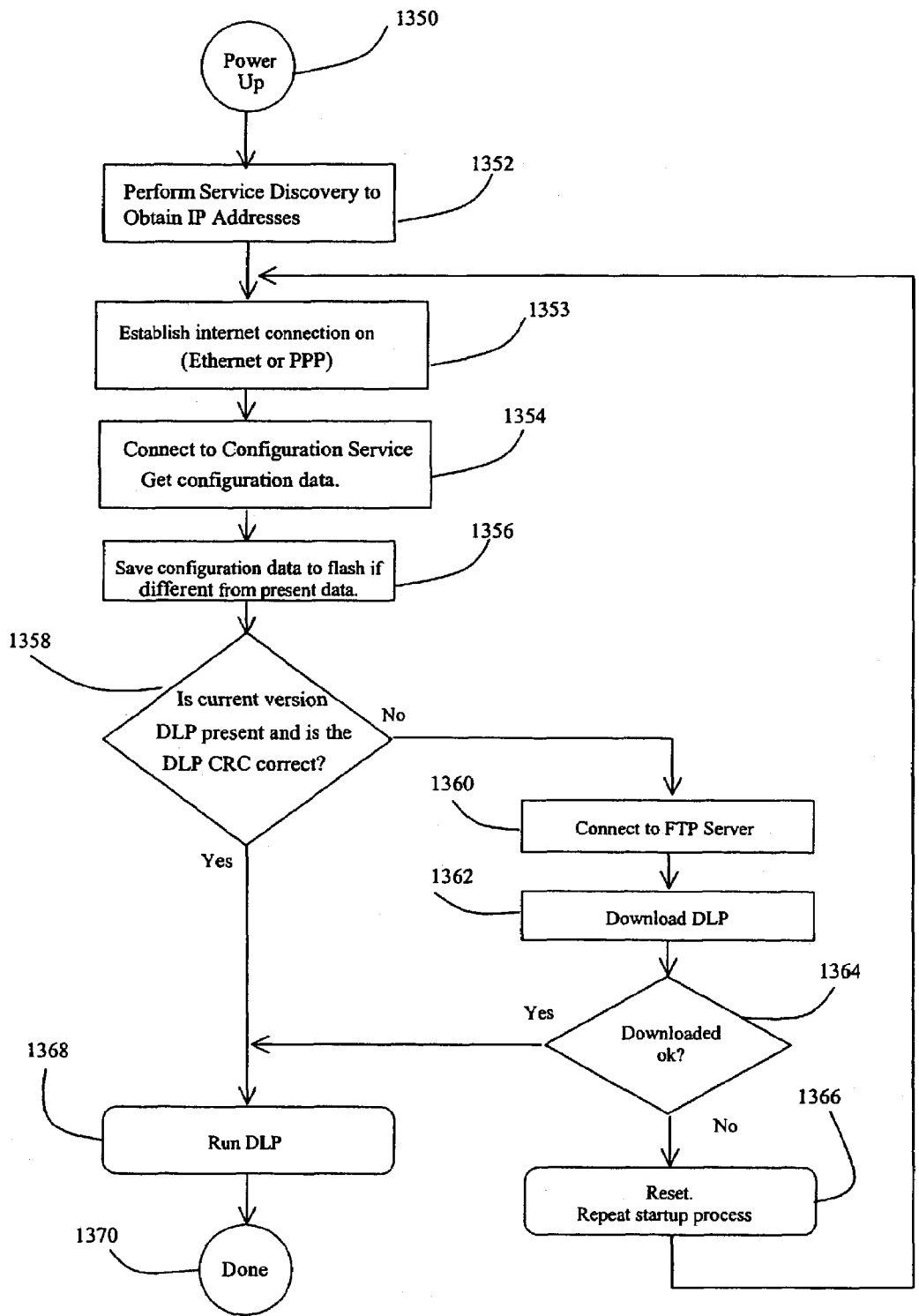

FIGS. 13A and 13B illustrate the procedures and parameters provided to the Terminal Adapter to accomplish software download and configuration management according to the principles of one embodiment of the present invention.

Figure 14:
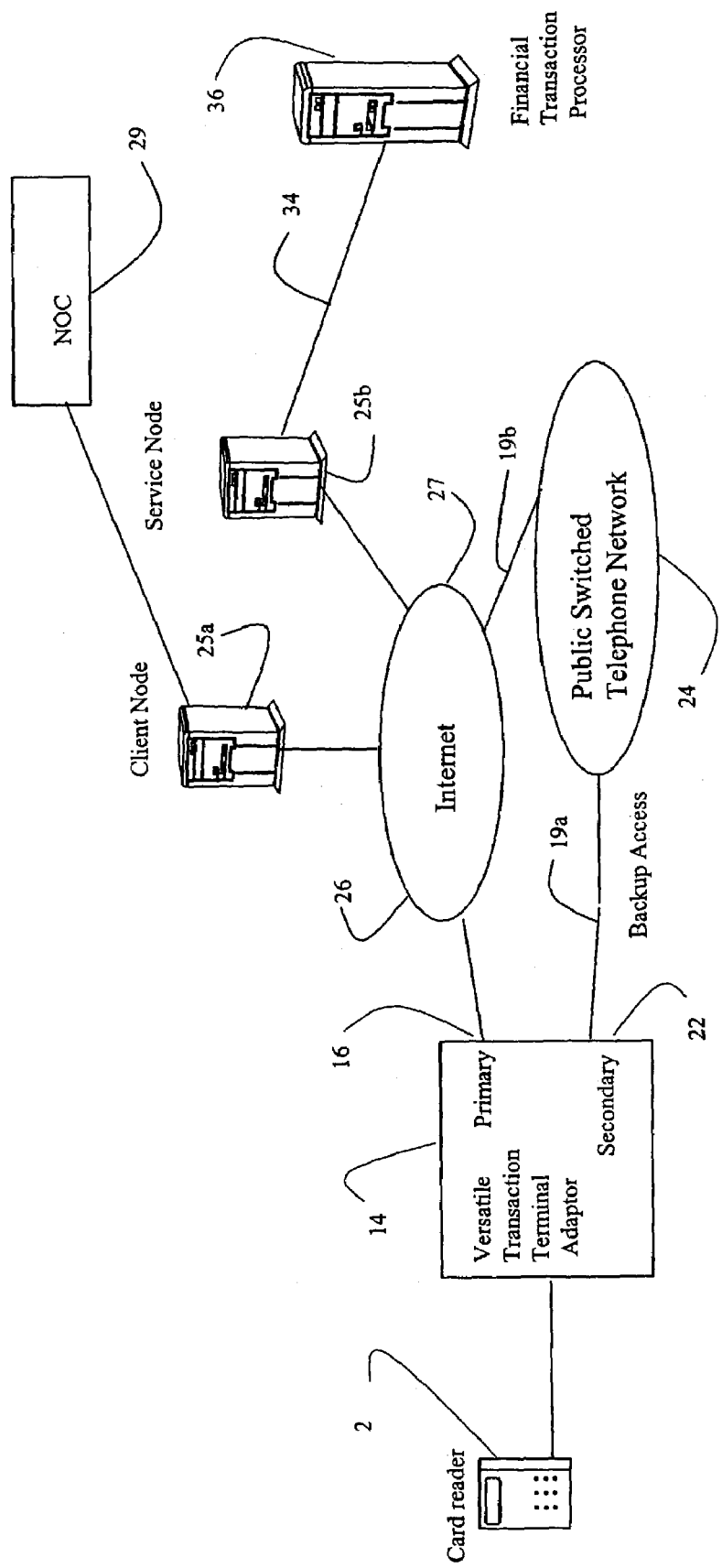

FIG. 14 illustrates various operational aspects of the Terminal Adapter according to the principles of one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is directed in part to a versatile transaction terminal adapter ("Terminal Adapter") interworking various types of terminals with a value added network ("Network") for the purpose of accomplishing transactions, including financial transactions, which will be principally used to illustrate the principles of the present invention. The Terminal Adapter is designed to utilize the services of the Network, which in turn utilizes a communication infrastructure, such as the Internet, to provide the goals of reliable, secure and efficient communications in a low cost manner. Alternatively, the Network could utilize other communication infrastructures, such as virtual private networks, ATM networks, WANs, or similar technologies to accomplish these goals. Further, although the principles of the present invention are illustrated using certain types of embodiments, communication infrastructures, and categories of transaction types, it will be readily appreciated that other communication networks or devices could incorporate the principles of the present invention for a variety of transaction types.

SYSTEM OVERVIEW

A system perspective of one embodiment of the invention is shown in FIG. 1. In FIG. 1, the terminals of system 1 are typically located on the premises of a business, such as a retail store, bank, merchant, etc. although it is not restricted to commercial sales applications. A common example is a card reader 2 located in a retail store, which can be a credit card reader, debit card reader, or any other type of magnetic card reader, optical card reader, or 'smart' card reader. In FIG. 1, the card reader 2 is illustrated as directly connected to the Terminal Adapter. The connection between the card reader and the Terminal Adapter can use a variety of connection means, and frequently incorporates an RJ-11 telephone-type jack based on a Plain Old Telephone (POTS) interface. Specifically, the card reader expects to interface with the Public Switched Telephone Network (PSTN), which the Terminal Adapter emulates.

FIG. 1 also illustrates a plurality of card readers 4, which can be of the same type as the previous card reader 2, but which are connected to a multi-card reader controller 6. The controller 6 aggregates a plurality of card readers and multiplexes their transactions onto a single communication facility. In this illustration, the controller 6 is connected to the Terminal Adapter 14. The interface presented by the Terminal Adapter 14 to the card reader 2 could be the same interface presented by the Terminal Adapter 14 to the multi-card-reader controller 6. These are but two of many arrangements that may be used to connect a terminal to the Terminal Adapter. For example, one embodiment of the Terminal Adapter connects several identical card readers 2, one terminal to each interface of the Terminal Adapter 14.

The terminal is not restricted to being a card reader, but may be a more sophisticated device, such as an Automatic Teller Machine (ATM) 8. This type of terminal performs financial transactions, although the nature of the transaction may be more complicated or varied than that of a credit card authorization associated with the previously identified card readers 2, 4. The ATM 8 is illustrated as directly connected to the Terminal Adapter 14 and the ATM and Terminal adapter can be co-located together or remotely located from each other. Again, various communication arrangements may be used to effect the communication between the ATM terminal and Terminal Adapter 14 including the use of multi-terminal controllers 6 previously disclosed.

Finally, FIG. 1 also illustrates a personal computer (PC) based Point-of-Sale (POS) terminal 10 having an integrated card reader 11 accessing the Terminal Adapter 14 via a modem 12. The POS terminal is typically a personal computer adapted for POS applications using standard operating software, such as the Microsoft Windows™ operating system and controls the modem using one of several command languages, such as the Hayes™ compatible modem command or XON/XOFF commands. Those skilled in the art will recognize that alternative configurations are possible. For example, the POS terminal 10 could interface with the Terminal Adapter 14 using a USB cable connected to USB ports, a serial RS-232, or RS-422 interface. Alternatively, the modem functions, or subset thereof, may exist in the POS terminal or in the Terminal Adapter as a virtual device driver. If the modem functionality is integrated into the Terminal Adapter, it could be a 'software' modem or virtual modem. Specifically, driver software emulating a modem's command interface in the Terminal Adapter allows the POS terminal to interact with the Terminal Adapter as if there were an actual hardware modem connected to the POS' serial interface. The POS terminal issues standard modem commands via the serial interface that are, in turn, processed by the Terminal Adapter emulation software. Further, the functionality of the Terminal Adapter can be integrated into the personal computer or the POS terminal by defining a 'softmodem' or virtual modem. Alternatively, the softmodem could be implemented in a client-server system comprising terminals and a server.

Other variations are possible, including the Terminal Adapter providing interfaces incorporating a poll select asynchronous packet based protocol, such as the X3.28-1976 ISO protocol, X.25, frame relay, or bisync protocol to interface with other types of terminals. Further, the invention is not limited to card reading or POS terminals, but includes terminals conducting transactions based on other inputs, including badge readers, OCR scanners, RF identifier tag readers, sensors, special purpose personal computers, computers processing manual keyboard input, or any other type of transaction-oriented processing device. Additionally, the card reader need not be synonymous with the terminal or incorporated in the terminal, and instead, the terminal can be considered to have, or comprise, a card reader so long as the terminal, such as the POS embodiment, is in communication with a card reader or similar functioning input device. Although a preferred embodiment of the present invention is directed to financial transactions, the principles of the present invention could apply to transactions of a non-financial nature, such as telemetry, alarm, maintenance, health care, pharmacy, or other applications typically involving card readers for 'card swipe' transaction processing.

The Terminal Adapter 14 can be considered as having a 'front end' comprising the terminal interfaces 2, 4, 8, 10. The front end of the Terminal Adapter can be configured in a variety of ways, including interfacing a single terminal or a plurality of terminals. If a plurality of devices are interfaced, then the interfaces may be identical (e.g., all POTS based), all different (e.g., a POTS and RS-232 serial interface), or a hybrid combination (e.g., two POTS interfaces and two RS-232 interfaces). In one embodiment, four POTS type interfaces are provided and in another embodiment, two POTS type interfaces and two asynchronous RS-232 interfaces are provided. Obviously, other combinations of interfaces on the front end are possible and are dictated primarily by commercial business motivations, capacity, and cost concerns.

The Terminal Adapter 14 can also be considered as having a 'back end' comprising network interfaces interconnecting with network communication facilities. In FIG. 1, the Terminal Adapter 14 has two network interfaces on the back end. One interface 16 is an Ethernet interface; typically connecting to a LAN 18 and designated the primary interface. This interface could be a 10BaseT type of Ethernet access, although those skilled in the art will readily recognize other types of LAN/MAN access standards could be used such as FDDI, token ring, token bus, 802.11x, etc. The LAN 18 facilitates interconnection 26 with the Internet 20, since the Terminal Adapter may not always be in close proximity to the interface to the Internet interface. For example, a store operating multiple sales stations may have a Terminal Adapter located in the store connected via the primary interface 16 to the corporate LAN 18 that in turn then provides access to the Internet 20. The LAN also isolates the Terminal Adapter from the various Internet access arrangements. For example, the Terminal Adapter 14 is isolated from changes or upgrades in the physical connection 26 to the Internet, whether it be DSL, wireless, T1, etc.

The LAN 18 in turn interfaces to the Internet 20 using one of the variety of communication facilities 26, including: DSL, T1, T3, dial-up, ISDN, optical fiber, cable modems, WiFi, satellite, etc. The Terminal Adapter accesses the Internet interface on the back end using either the PPPoE (Point-to-Point Protocol over Ethernet) protocol or the DHCP protocol when using Ethernet access. PPPoE and DHCP are well known approaches to achieve TCP/IP access to the Internet over Ethernet and are well known in the art of data communications. The primary interface 16 is preferably a high-speed interface, at least fast enough to accommodate the transaction volume of the plurality of terminals.

The Terminal Adapter 14 may also have a secondary interface 22 on the back end illustrated by a connection to the Public Switched Telephone Network (PSTN). The second interface provides back up communication capability in the event the primary communication path is inoperable and typically operates at a slower speed than the primary interface. This secondary interface typically uses a telephone line and the Terminal Adapter typically incorporates an integrated modem and PPP access protocol. The PPP is well known in the area of data communications for obtaining TCP/IP access to the Internet over dial-up. The PSTN is noted for its reliability and ubiquitous availability, although dial-up access speed is limited. However, it is usually the case that a business location will have a telephone line for dial-up access for voice that can intermittently be used for dial-up access to an ISP, whereas alternative access methods (such as DSL) are not nearly as common. However, the Terminal Adapter 14 could incorporate such alternative access arrangements for the secondary interface, including: DSL, ISDN, frame relay, X.25, or some other communication protocol for the secondary interface. The secondary interface could even be the same type as the primary interface. Typically, the secondary interface is based on modems providing speeds of 28.8 Kbps or 56 Kbps (e.g., V.34 or V.90), although other rates could be used.

The Terminal Adapter of this embodiment relies on connectivity to the PSTN for secondary access in the situation where the primary communication path is not functional in two ways. First, a preferred embodiment uses a facility 30 to access the Internet 20 to provide an alternative route to the Network 33 so that the same set of services are provided. A second embodiment incorporates a facility 32 directly connecting the Transaction Processor 36. In this embodiment, the Transaction Processor 36 could implement the processes for providing the same value added services as provided by the aforementioned infrastructure 28, or alternatively, the Financial Transaction Processor may not provide the additional services and allow the secondary communication path to have a reduced level of functionality, while still providing connectivity. This may be an acceptable business alternative, since transaction applications using a point-to-point POTS connection between the Terminal Adapter and Transaction Processor may find it acceptable to operate without all the value added services on an interim basis.

The Internet 20 provides a communication infrastructure for transporting information and provides a set of well-known services using the TCP/IP protocol stack. However, the needs of the terminals to perform financial transactions (or, other applications as previously noted) may not fully be served by the data communication services provided by the Internet. For this reason, various service extensions are required. These Value Added Services 28 are provided by various Nodes connected to the Internet operating an additional protocol on top of the TCP/IP stack. Together, the Internet and the Nodes provide enhanced services and comprise the Network 33. Although the Internet may be associated with one embodiment, the Value Added Service Network could be comprised of various Nodes operating on top of other networks such as WANs, LANs, or virtual private networks based on a variety of technologies. The value added services provided by the Network provide additional security, reliability, and flexibility to facilitate other functions that will be described in further detail. This architecture is based on the concept of protocol layers and is well known in the art of data communications.

FIG. 2 further expands on one possible embodiment of the Internet 20 and Value Added Services 28 that comprise the Value Added Network 33. As is well known, the "Internet" is not a single network, but a collection of networks operating in a cohesive manner. This is illustrated in FIG. 2 by depicting the Internet 20 as two interconnected Internet Service Providers 27. In practice, there are literally thousands of such networks comprising the "Internet." The services provided by the Internet use the TCP/IP protocol and are well known, but may not be sufficient in terms of reliability and security for transaction processing. Consequently, Nodes 25 are defined providing these additional functions in the Network.

The Nodes 25 are connected to the Internet and may be directly interconnected as well (not shown). While three Nodes are illustrated, in practice there may be many more, deployed in diverse geographic areas, replicated for redundancy, and interconnected for reliability. Further, some Nodes 25 may be collocated or integrated with other equipment, such as the Transaction Host Processors 36 or Internet routers, LANS, gateways, bridges or PBX's.

There are three types of Nodes that typically implement the value added services and these are the Client Node 25a, the Core Node 25b, and the Service Node 25c. The Client Node 25a interfaces with the Terminal Adapter, typically using the transport capabilities of the Internet. Although not illustrated, it is possible that the Terminal Adapter could directly connect to the Client Node 25a using any number of communication facilities. This would represent an embodiment where the Client Node and Internet router functionality are integrated. The Client Node 25a recognizes the Terminal Adapter 14 and performs synchronization, security, authentication, and error detection functions in addition to relaying and/or interworking information to the Core Node 25b. The Core Node is not always required, but if present, it relays information across the same or different ISP providers 27. The Core Node 25b may relay information to other Core Nodes or to a Service Node 25c as illustrated in FIG. 2. When the Core Node routes to another Core Node, it can route the transactions to the least busy Core Node, or reroute to an alternative Node in case of a Node failure. The Service Node 25c interfaces with the Transaction Host Processor ("Host") 36 using any number of point-to-point facilities 34. The Service Node converts the protocols used when receiving transaction from another Node to the protocol used in communicating with the Host 36. In general, many of the services and features the Terminal Adapter provides with respect to a terminal can be provided by a Service Node to a Host Processor. Thus, for example, a Host Processor could initiate a transaction to another Host. Typically, the connection 34 from the Service Node to the Host is a high-speed digital facility capable of multiplexing significant numbers of transactions.

Since reliability is a major concern in financial and other types of transactions, the Nodes 25 are typically replicated in diverse locations. For example, the Service Node is duplicated (not shown in FIG. 2) in a diverse geographical location and also connected to the Host processor so that the Host can continue to communicate to an alternative Service Node if one Service Node or communication path fails. The Service Nodes may be load balanced (e.g., each typically providing 50% of the total transaction traffic to the Host) or configured with one Node as a hot standby (providing 100% of the transaction capacity, but switchable to the other Node when required). Similarly, each Service Node is typically connected to a plurality of Core Nodes. Those skilled in the art of network architecture will recognize the various arrangements that can be used for providing reliable access between the Host and the Terminal Adapter. Further, the Host may be replicated in a geographic diverse location for redundancy and reliability reasons.

FIG. 2 also illustrates a Network Operations Center (NOC) 29 connected to the various Nodes 25. The NOC 29 administers and manages the operation of the Nodes and Terminal Adapters with respect to the Network. With respect to the Nodes, the NOC receives measurements, alarm information, traffic statistics, load levels, and similar information and acts accordingly. For example, if a Node is not functioning correctly, adjacent Nodes will reroute around the non-functioning Node. The NOC becomes aware of the status of the non-functioning Node and can monitor the status of the Node while the problem is investigated and corrected. With respect to Terminal Adapters, the NOC is also aware of their operation and maintains a profile for each Terminal Adapter 14 and its corresponding Client Node 25a. This allows the NOC to know the current network conditions and operating status of each element, including both Nodes and Terminal Adapters.

The NOC can further communicate indirectly to the Terminal Adapter by sending management messages relayed by the appropriate Node by piggybacking messages with the parameter file fetch response. The NOC (via the Network) can send a command to reset the Terminal Adapter, direct the Terminal Adapter to switch from its primary communication path to its secondary communication path, or switch to a different Client Node.

Normal Operation

The normal operation of the Terminal Adapter is typically divided into two phases: pre-transaction processing and transaction processing transfer. Several functions must be accomplished in the pre-transaction processing phase in order to communicate transactions in the data transfer phase. In this context, 'pre-transaction processing' refers to actions occurring prior to the processing of terminal originated transactions. As will be discovered, the Terminal Adapter uses the transaction protocol procedures to bootstrap itself in order to subsequently process transactions from the terminal. Thus, transaction messaging is used between the Terminal Adapter and the Network in the 'pre transaction processing' phase.

Because various aspects of the pre-transaction processing and transaction processing phase generally rely on data that is hardcoded into the Terminal Adapter, this data is briefly discussed. In other embodiments, such as the softmodem incorporated into a PC, the PC manufacturer obviously does not hardcode these values into the PC's firmware. In these embodiments, these values are programmed into the device manually or loaded by reading a file.

Embedded Data

One type of data manufactured in the firmware of each Terminal Adapter of one embodiment is a Terminal Adapter Identifier value that uniquely identifies the device. This value may in the format of: <manufacturer id> <model number> <serial number> <suffix>. This structure forms a 24 byte identifier, although other structures and values may be used to achieve a unique identifier programmed into the Terminal Adapter. For example, the MAC address (associated with the Ethernet network interface) could be concatenated with the serial number and used as an identifier. The Terminal Adapter Identifier is typically sent in all messages to identify the particular Terminal Adapter to the Network and allows in part, the Network and NOC to maintain status and service profile information for each Terminal Adapter.

Another instance of data programmed into the Terminal Adapter of one embodiment is a secret key used in encryption and authentication. The secret key value is not communicated over the interface, but used both by the Terminal Adapter and the Network to encrypt information that is communicated over the interface. As is well known, the use of encryption also facilitates authentication of a particular Terminal Adapter. Authentication can be accomplished by the Terminal Adapter and Network encrypting a common data value, exchanging and then comparing the result. Only if the Terminal Adapter has the correct secret key will its encrypted value match the Network's value. As for using the secret key for encrypting transactions, encryption is accomplished using a key derived from the secret key, the session token and the transaction counter. In this manner, if an unauthorized user cracks a message, the secret key is not revealed, and hence other messages are not compromised.

The Terminal Adapter of one embodiment also stores a default Configuration Service Name that describes the parameter file version currently held in non-volatile memory. In this embodiment a value is programmed into the Terminal Adapter describing the parameter file version initially present at power up, but then a dynamically determined value is obtained from the Network and supercedes the default value.

Another instance of data programmed into the Terminal Adapter of one embodiment is a default Service Name. The Service Name is a default URL of a server providing 'bootstrap' address information, typically in the form of a set of Client Nodes IP addresses that the Terminal Adapter uses to interact with for transactions and management functions (e.g., parameter downloading). Usually, a Terminal Adapter uses a single address for these functions, but for various reasons including reliability, alternative values are provided.

These values are programmed into the Terminal Adapter as default values. In many cases, the default values are typically augmented with dynamically determined values provided by the Network as part of the bootstrap process. The dynamically obtained values do not erase the default values (recall that the default values are hardcoded into the Terminal Adapter), but the Terminal Adapter stores both and knows by the presence of the dynamic values that the default values have been superceded.

Pre-Transaction Processing Phase

Upon power up, the Terminal Adapter generally executes several related procedures. In one embodiment, these are: Service Discovery, Synchronization and Authentication, Parameter Downloading, and Software Downloading. All are executed upon initially powering up the Terminal Adapter, but thereafter, the procedures may be invoked separately. Upon initial powering up, the Terminal Adapter of this embodiment first invokes a Service Discovery process to obtain a list of IP addresses that correspond to Client Nodes. This is accomplished by sending a Service Discovery request using the service name address that is permanently encoded into the Terminal Adapter.

The Terminal Adapter of this embodiment then synchronizes and authenticates itself to the Network. These procedures occur together, so that authentication follows whenever synchronization occurs. Thus, 'synchronization' implies synchronization and authorization wherever context dictates such. Synchronization is generally required prior to sending transaction requests, and occurs frequently after the Terminal Adapter has initially powered up. For example, if the Terminal Adapter has been idle for a long period, re-synchronization may be required. Synchronization is discussed in detail in conjunction with the normal transaction transfer, so that this explanation can focus on the initial power up functions.

After synchronization, the Terminal Adapter of this embodiment selects one of the IP addresses obtained using service discovery and uses it to initiate a parameter download using a transaction request. As discussed subsequently, this is of the form known as a 'simple' transaction request. The parameter file contains various configuration and address information to facilitate operation of the Terminal Adapter. The parameters may indicate, in part: where transactions should be sent to, primary and secondary communication path information, and where to obtain new software applications for software downloads. The Terminal Adapter typically downloads a parameter file by indicating its current parameter file version to the Network. This is an implicit request to the Network to indicate whether a more current version exists. Upon initial powering up, this value indicated by the Terminal Adapter is typically the default Configuration Service Name encoded into the Terminal Adapter. When the Network receives the default Configuration Service Name, it knows to route the request to a specified process server and a configuration version number of zero indicates that the Terminal Adapter is requesting an initial parameter download. The Network responds by sending the current name of the parameter file version along with the parameter data.

Next, the Terminal Adapter of this embodiment examines certain parameters in the parameter file to determine whether a software download should occur. Software download refers to downloading new application code (binary image file) for execution. The Terminal Adapter examines the binary image name of the most recent executable file as indicated by the Network in the parameter file and compares it with the current value stored in memory. If the Terminal Adapter finds a different executable file indicated compared to what is stored in default memory (which is likely the case upon initial powering up), the Terminal Adapter fetches the new executable file. The location to fetch the executed file from is typically indicated by an address in the parameter file. After the Terminal Adapter loads and executes the current application, it is ready to process transactions from a terminal. Thus, the transaction processing phase is ready to start.

Transaction Processing Phase

Prior to sending a transaction, the Terminal Adapter is typically synchronized and authenticated to the Network. This generally occurs during initial power up, but may be required again. Resynchronization occurs frequently and is considered normal operating procedure. Synchronization facilitates orderly transaction processing between the Network (specifically, the Client Node) and the Terminal Adapter, as well as enhancing the security of the transaction by exchanging a new session token. Resynchronization may be required if errors occur when the Terminal Adapter switches from the primary to secondary communication path, or when the Terminal Adapter switches from one Client Node to another. Authentication is required to ensure the Network is communicating with a trusted entity and to pass encryption parameters (e.g., a session token, as discussed subsequently) to the Terminal Adapter.

In the embodiment of FIG. 3, the Terminal Adapter 301 first opens a TCP connection with the Network 303 in step 300. The Terminal Adapter sends a synchronization request at step 302 and includes a transaction counter (TC) in the header of the message. Thereafter in subsequent transactions, the Network will expect the transaction counter to be incremented over the current value each time a transaction is sent. If the Network receives an unexpected value, an error code is returned to the Terminal Adapter and the Terminal Adapter is required to re-synchronize its transaction counter. Re-synchronization is required under various conditions, including: the Terminal Adapter being idle for a long period, switching from primary to secondary communication paths, or being unable to complete a transaction.

The Network records the TC value and computes a Message Digest. A message digest is a condensed text string that has been distilled from the contents of a text message where its value is derived using a one-way hash function and is used to create a digital signature. The Network may use a particular form known as a Message Digest 5 (MD5) based on a Random Value (RV) and the Transaction Counter (TC). This is returned in a Synchronization Response at step 304 that signifies synchronization has occurred and that the Terminal Adapter should authenticate itself.

The Terminal Adapter responds by formulating a Message Digest type 5 (MD5) based on a secret key (PUC) and the transaction counter (TC) in step 306 and sending it to the Network. The Network compares this value with its previously computed value, and assuming a match, returns a response in step 308 indicating authentication has successfully occurred and includes a session token (ST). The session token is encrypted using the Message Digest and is used by the Terminal Adapter to derive the key used for subsequent encryption/decryption in the data transfer phase. Finally, when completed, the Terminal Adapter may close the TCP connection in step 310. Alternatively, the Terminal Adapter may leave the TCP connection open and avoid the additional steps of opening a TCP connection prior to entering a subsequent data transfer phase.

There are alternative security and authentication means that could be used to authenticate and encrypt information, including other public and private key schemes such as RSA, PGP (Pretty Good Privacy), etc. Those skilled in the art will recognize that a variety of message types, formats, and encryption techniques could be used to accomplish the function of synchronizing and authenticating the Terminal Adapter and Network, but these are all within the principles of the present invention.

The Transaction Processing Phase is used to convey transactions initiating from the terminal, and in one embodiment, there are two methods to accomplish this: simple transactions and session transactions. The simple transaction is composed of a single request-response pair of messages. These are often used in credit card or ATM based transactions where a single message pair is sufficient to complete the transaction. The process is illustrated in FIG. 4.

In FIG. 4, the Terminal Adapter 400 communicates with the Network 402, typically with a Client Node 25*a*. The Network 402 also communicates with the Host 404, which is the Financial Transaction Processor 36 of FIG. 1.

The Terminal Adapter must open a TCP connection in step 406 if one has not already been opened. After that, a Simple Request 408 is sent to the Network, which then routes the message to the appropriate Host in step 410. The Host processes the transaction 411 and responds in step 412. The Network 402 receives the response and forwards it in step 414 to the Terminal Adapter 400. The Terminal Adapter extracts the response 416 and sends the response to the Terminal (not shown). If there are additional transactions that can use the same TCP connection, then the process repeats at step 418. If there are no further transactions, the Terminal Adapter will close the idle TCP connection at step 422 and any additional transactions at step 420 will result in re-opening a TCP connection at step 406.

The other method for sending a transaction in this embodiment is using the Session Transaction. The Session Transaction is used for more complex transactions, such as settlement activities occurring at the end of day. For example, in some business implementations the POS terminal retains data for the financial transactions during the day and must send summary information to the Host for end-of-day settlements. A Session Transaction is composed of multiple request-response pairs and is more appropriate than the single request-response for transferring lengthy transactions. The Session Transaction is composed of multiple request-response pairs that are guaranteed to be delivered in sequential order to a Host on the same logical connection. When a Session Transaction is initiated, the Client Node initiates a session with the appropriate Service Node and the Service Node responds with session context information, such as address and port information. This allows the Client Node to map subsequent message associated with the session. If transaction data is provided by the terminal, the Client Node includes the data in the session initiation message, and the Service Node forwards this to the Host. The session context also enables the terminal adapter to continue a session using a different Client Node in the event that the initial Client Node becomes unavailable. This process is illustrated in FIG. 5.

FIG. 5 illustrates the Terminal Adapter 500 communicating with the Network 502, which in turn, communicates with the Host 504. The Terminal Adapter must open a TCP connection in step 506 if one has not already been opened. Then, the Terminal Adapter communicates an Initiate Session request at step 508 to the Network, along with transaction data. The Network routes the message to the appropriate Host at step 510. Specifically, the Client Node receives and relays the message to the Service Node, which then relays the message to the Host. The Host processes the transaction data at step 512 and conveys the response 514 to the Network and then conveyed again 516 to the Terminal Adapter. At this point, the Terminal Adapter in step 518 is prepared to send transaction data and the Network has established internal session tables for mapping subsequent terminal messages to a specified session and host. The Transaction Data is formulated at step 520 and a Session Transaction request is sent to the Network at step 522, which then routes the request 524 to the Host, which processes the transaction 526. The response 528 is conveyed to the Network and back 530 to the Terminal Adapter that extracts the response data 532. If additional transactions are desired, the process repeats at step 531. Once all the transaction request-response messages are conveyed, the Terminal Adapter then formats a Terminate Session request 534 and sends it to the Network at step 536. If transaction data is included, the Network forwards it to the Host 538 and processes the message 540. The Host sends a response 542 that is forwarded by the Network to the Terminal Adapter 544 in the Terminate Session message closing the session 546. Once completed, the TCP connection can be closed 548.

Both transaction forms have common aspects. First, transaction messages in either form incorporate a Terminal Adapter Identification Number. This may be the value hardcoded into the Terminal Adapter or, in the case of a PC executing software emulating a terminal adapter, the value can be programmed into the device. The Terminal Adapter Identification Number uniquely identifies the device connected to the Network 33. This unique value allows the Network to maintain information for each Terminal Adapter using the Network. If an error condition exists the Network will be able to correlate the condition to a particular device and take action as necessary. This may include, for example, notifying appropriate service personnel to investigate a problem, such as a defective Terminal Adapter. Further, statistics regarding each transaction can be maintained and recorded for a given Terminal Adapter, allowing value added information to be mined from periodic reports.

Second, both types of messages utilize error detection using well-known techniques, such as cyclic redundancy codes (CRC). This allows easy detection of errors in a transaction detectable by the Network, Host, or Terminal Adapter and ensures only uncorrupted data is processed.

Further, both transaction forms utilize encryption based on a secret key that is programmed into the Terminal Adapter at the time of manufacture. The encryption schemes are based on the 3DES, AES, or any other scheme well known in the art. The 3DES and AES schemes encrypt multiples of 8 or 16 bytes cipher texts respectively, and when the cipher text is not a multiple of the block size, then the cipher text is zero padded to the appropriate length. The encryption key may be generated based on running MD5 on the concatenated value of the private key (known to the Terminal Adapter), the transaction counter, and the session token.

Additionally, both transaction forms indicate a service name that is used by the Network to determine the appropriate host for processing the transaction. The Service Name is derived from the parameter download and is used by the Network to identify a particular Service Node to then deliver the transaction to the appropriate host.

Those skilled in the art will recognize that the message formats for conveying this information can be of various formats. In one embodiment, messages indicate a packet type with values defined for session request/responses and simple transaction request/responses. A variety of encoding and structures can be used to convey the above information as well as encode the information.

The above capabilities for communicating transactions between the Terminal, Network, and Host ensure that:
only trusted entities are allowed to initiate a transaction with the Network;
transactions are recognized in an orderly manner by the various entities;
transactions are error checked at various points to ensure no errors occur during communication;
transactions are encrypted prior to delivery to the Network to ensure unauthorized recipients cannot understand the contents; and
Terminal Adapters are uniquely identified to allow correlation of transaction related events with a specific user of the Network.

The system in which the Terminal Adapter operates can also be viewed with respect to the protocol stacks. As illustrated in FIG. 6, a protocol stack 650 is implemented in the card reader 2 comprising a POS application 651, which is typically programmed at time of manufacturing. This application uses the services of a financial transaction protocol 652 such as the VISA-II (a.k.a. VISA-2) protocol to transmit credit card authorizations. This in turn, relies on a telephone protocol 653 that comprises the physical, modem and traditional dial-up procedures to communicate over a phone line 654 to the Terminal Adapter 14. The Terminal Adapter containing protocol stack 656 receives the information over the telephone cable 654, decodes the information using a corresponding telephone protocol 655, and relays 657 the financial transaction protocol information over the backside interface. This 'backside' interface uses the value added services layer 658 to provide a secure and robust transmission of data to the host 636. The value added services layer 658 uses the TCP/IP protocol layer 659 and incorporates the aforementioned authentication, synchronization, and encryption procedures for sending transactions. The transactions are communicated using the TCP/IP over Ethernet requiring the use of the IEEE 802.3 Ethernet protocol layer 660. The LAN is typically a 10BaseT Ethernet connected via the Internet.

Not all the protocol stacks for all the physical elements are illustrated, as they are not required to illustrate the principles of the present invention. For example, the Ethernet/Internet bridging the LAN and providing Internet access is not illustrated as it is transparent to the value added services layer and higher layers. Further, only one Value Added Service Node in the Network 33 is illustrated by the protocol stack 662. This Node is a combination Client Node and Service Node as it interfaces both to the Terminal Adapter and the Host. In practice, a separate protocol stack for a Client Node and a Service Node would typically exist, communicating with each other using the Internet or other facilities. Those skilled in the art will recognize many other variations as well.

The Value Added Service Node receives data via the lower layer 665, processed by the TCP/IP layer 664 and then processed by the added services layer 663. If acceptable, the data is relayed by the financial transaction protocol layer 666 back down a TCP/IP layer 667 and a physical layer 668, which can be based on a variety of protocols (e.g., T1, DSL, etc.). The relaying layer 666 in the Node may or may not convert the financial protocol to another variant as required by the Host. The data continues via the physical facility 669 and then to the Financial Transaction Host 636 that implements a protocol stack 674 comprising a physical layer 670, TCP/IP layer 671, a financial transaction protocol 672, and a POS application.

In this architecture, the two POS applications 651, 673 communicate in a client-server fashion, as does the value added services protocol layer 658 in the Terminal Adapter with the value added services protocol layer 663 in the Value Added Service Node 25. This type of modeling of protocol layers is well known in the art and indicates information that is transparently conveyed by a lower layer that provides services to the higher layers. The value added services layer typically is in communication with an internal management application executing in the Terminal Adapter and communicating with the NOC (not shown). This allows the value added services layer to respond to actions and events outside the direct scope of the value added services protocol itself.

For example, one service provided by the value added services layer 658 is data reliability. The management process in the Terminal Adapter detects a failure in the primary communication path from the backend of the Terminal Adapter. The failure detected on the backend of the primary network interface can be any type of failure in the Ethernet physical layer 660 (assuming Ethernet access for the primary communication path), the TCP/IP layer 659, the added services layer 658, or the PPP layer 666 (assuming dial-up access is used for the primary communication path). For example, a physical cut in the Ethernet would result in a loss of electrical signals at the physical layer 660. A physical cable cut would also result in a failure at the TCP/IP layer 659, since no frames could be transmitted. Other failures could be solely at the TCP/IP layer, such as the failure to resolve an address request (e.g., URL), or failure to receive a response at the TCP/IP level. A failure at the added services layer 658 could occur if there was a catastrophic failure of the Services Node 25, which would leave the lower layers functional from the Terminal Adapter's perspective. For whatever reason a failure is detected, the management process, directs the value added services layer 658 to establish secondary communication, redirects any subsequently received terminal transaction requests to the secondary communication path, and resumes the transaction processing. During a failure on the primary communication path, the Terminal Adapter returns an error to the terminal (which depends on the terminal interface). Typically, the terminal reattempts initiating the transactions and the Terminal Adapter typically has established the secondary communication path by this time.

Another service provided by the Terminal Adapter's value added services layer 658 in conjunction with the Value Added Services Node 25 may be service discovery and transaction synchronization. Service discovery allows the Terminal Adapter to obtain addresses used to then discover the locations of the appropriate host to which transactions are directed. In this embodiment, an address and port location is provided to address transactions, but other addressing information could be used in other implementations. In conventional systems, the Card Reader 2 is typically programmed with a telephone number establishing a direct connection to a host. Thus, each terminal is programmed with a destination address of the Host. In the present system, the Terminal Adapter determines the appropriate Host to relay the financial transaction information based on information provided by the Network 33. Further services may include security features that involve a Terminal Adapter to first synchronize using a transaction counter prior to communication of transactions. Further, the Terminal Adapter may identify itself using a unique programmed identification number to the Network 33. Finally, the Terminal Adapter may authenticate itself using a Message Digest. These activities ensure that Network is communicating with a known, trusted entity in a coordinated manner.

The Terminal Adapter may also provide some value added functions separate from the data transfer capabilities of the value added service layer. These can be viewed as management oriented functions and augment the functionality of the Terminal Adapter. For example, automatic configuration of the transaction protocol used by the card reader 2 allows a variety of terminals to interface with the Terminal Adapter. The card readers 2 are typically programmed with a pre-defined credit card authorization protocol, such as Visa-II, and rely on the recipient (typically the host, via the PSTN) to know, a priori, which protocol is used. The Terminal Adapter 14 can work with a variety of terminals and is programmed to automatically detect and determine which financial protocol to use and the address to which the transaction is to be directed. Thus, the auto configuration capability provides a versatile Terminal Adapter.

Finally, the value added services layer in conjunction with the management application handles the downloading of new software and parameters. This ensures that when new value added network services are deployed requiring a corresponding enhancement in the software in the Terminal Adapter, this can be accomplished without having to physically replace the Terminal Adapter, replace an EPROM chip, or otherwise require manual intervention. This function allows the Network to remotely write parameters to the Terminal Adapter and maintain status information as well.

Hardware Overview

One embodiment of the principles of the current invention is illustrated in FIG. 7, which discloses the hardware configuration of the Terminal Adapter 14. The Terminal Adapter is comprised of various readily available integrated circuits. Turning to FIG. 7, the Terminal Adapter 700 comprises a 'front end' 706, which refers to the terminal interfaces and users inputs/outputs, as well as a 'back end' 708, which refers to the network interfaces.

The Terminal Adapter uses a microprocessor 702 as the main controller. Although the embodiment discloses a microprocessor, other variations such as single chip microcomputers or programmable controllers could be used. The microprocessor uses an Input/Output bus to control the various 'front end' interfaces. These may include a series of LED indicators 710 that indicates the overall status of the Terminal Adapter, network interface status, and terminal interface status. Alternatively, LCD or other types of displays or visual indicators may be used to reflect the status, using, for example, text or icons. The status indicators indicate whether the primary or secondary network interface is currently in use, modem carriers status, and other diagnostic related indicators.

The Console RS-232 interface 712 allows a local terminal to connect to the Terminal Adapter and facilitates programming the Terminal Adapter, indicating configuration changes, performing management functions, etc. The four POTS interfaces 714 are used to interface to the terminals using a standard RJ-11 telephone connector.

The microprocessor I/O bus also communicates with the network interfaces 708. This typically is the same I/O bus as used for communicating with the terminal interfaces, but it is represented as two separate busses for clarity. The network interfaces may comprise an Ethernet Interface 724, which uses a standard 10BaseT protocol, and this is used to convey the primary communication path. The Terminal Adapter may also incorporate another POTS interface 722 for conveying the secondary communication path as a backup network interface. In one embodiment, the Ethernet interface 724 may be optional as the telephone interface 722 may be used for conveying both the primary and secondary communication paths. Regardless of the configuration, the network interface provides connectivity for both the primary and secondary communication paths.

The microprocessor 702 also communicates with memory in the form of RAM 716, ROM 718, and non-volatile RAM 720 (e.g., 'flash memory'). In other embodiments, the ROM and limited RAM could be integrated in the microprocessor as commonly embodied with single chip microcomputers.

Finally, a power supply 704 is present and this may incorporate a battery backup for saving data in the case of a temporary power outage. A watchdog timer 726 may be incorporated for resetting the Terminal Adapter in case of a lockup. A Manual Reset push button 728 provides another form for resetting the Terminal Adapter.

Software Overview

The software components associated with the hardware components are illustrated in FIG. 8. The software architecture of the system 800 involves a real-time operating system 802 interacting with a TCP/IP protocol stack 804, value added services 832 and a transaction protocol handler, which in this embodiment, comprises the VISA terminal interface 844.

The TCP/IP stack comprises various well-known protocol handlers, such as PPPoE (point-to-point protocol over Ethernet) 806, PPP (point-to-point protocol) 808, and DHCP (dynamic host configuration protocol) 810. In addition, the IP (Internet protocol), ICMP (Internet control message protocol), and DNS (domain name server) protocols 812 are present, as well as the UDP/TCP (user datagram protocol/ transmission control protocol) 814, and the 802.3 Ethernet drivers 818.

The TCP/IP stack 804 interacts with the Network Interface Card 826 that is the primary network interface using the Ethernet transceiver 828 that connects to an RJ-45 connector 830. The TCP/IP stack 804 also interacts with the secondary network interact 820 that incorporates a modem driver 822 connected to an RJ-11 connector 824.

The Real Time Operating System 802 also interacts with various Value Added Services 832 that may be implemented via modules for conveying payload data 836, encrypting data 834, exchanging security keys 838, downloading software 840, and effecting service discovery 842.

Finally, the Real Time Operating System 802 also interacts with the Terminal Interface 844 comprising the software modules for a financial protocol handler 846, character handler 848, and modem handler 850. The Terminal Interface 844 then interacts with a POS interface 852 that multiplexes and formats the data to a modem standard 854 to one of the four RJ-11 connectors 856.

FIGS. 7 and 8 illustrate the principles of the current invention as embodied in a Terminal Adapter, but other embodiments exist. As previously indicated, the Terminal Adapter 14 is involved with communication with the Network 33, specifically the Nodes 25 or in other cases, indirectly with the NOC. Thus, the Nodes embody the inventive principles as well. The Nodes can be computer servers with large amounts of memory, parallel processing, and hundreds of I/O ports and operating using a variety of operating systems, including UNIX, Linux, and Windows.

The associated hardware and software structure may vary from that disclosed in FIGS. 7 and 8.

Another embodiment is a variation of the Terminal Adapter 14 based on a personal computer. While the Terminal Adapter embodied in FIGS. 7 and 8 is a special purpose computer equipped with special purpose application software, a general-purpose personal computer could have software installed for accomplishing the same functions. Personal computers frequently incorporate many of the hardware and software components illustrated in FIGS. 7 and 8 and commonly incorporate a modem and/or an Ethernet Network Interface Card (NIC) for providing Internet access. The personal computer would similarly implement PPPoE or DHCP for Internet access over the Ethernet, and PPP over a dial-up connection to an ISP using the modem. Further, many of the software capabilities (e.g., the TCP/IP stack and modem interfaces) are already present in Internet enabled personal computers. These frequently use a Microsoft Windows™ operating system, providing a well-known software platform for software development. Although a PC is a common embodiment for the Terminal Adapter functions, other embodiments are possible, such as installing the software in a minicomputer, or a server associated with a client-server implementation, where the server utilizes other operating systems, such as UNIX™ or LINUX™.

Another embodiment is possible where the personal computer is configured solely with a modem and dial-up capabilities, without Internet access. In this case, the connectivity from the personal computer uses a telephone line for both the primary and secondary communication means, but a different ISP is used and/or Client Node may be involved when dialing a secondary telephone number.

The software for such an embodiment may be loaded into the memory of the personal computer, including downloading the software from a web site on the Internet or uploading the application from a removable media (e.g., floppy disk, tape, CD, etc.).

In yet another embodiment, an API (application programming interface) library is provided allowing a third party to develop a system incorporating the value added functions according to the principles of the present invention. In this instance, the capabilities of the application are defined by the developer and loaded for execution on the PC.

The flexibility of the above embodiments is illustrated in FIG. 9 with respect to how various value added functions can be developed. In FIG. 9A, two embodiments illustrate how PC currently can access the Internet via an Ethernet and/or a dial-up connection. Specifically, in Alternative 1 900, the PC is executing a POS application 902 that uses the services of the Operation System 904. The Operating System may be any of the common operating systems found on PCs. In turn, the Operating System 904 uses devices drivers to interact with hardware interfaces. One device driver 906 allows interaction with a modem 910 that connects to a telephone line 916 as is well known in the art. The other device driver 908 interacts with a Network Interface Card (NIC) that is connected to an Ethernet 914.

An alternative embodiment is illustrated in Alternative 2 920 that similarly incorporates a POS application 902, Operating System 904, and device drivers 924, 926. However, these device drivers interact with interfaces on the PC. Specifically, one device driver 924 interacts with a serial RS-232 interface connected to a modem 930. The other device driver 926 interacts with a USB (Universal Serial Bus) connected to a NIC 928. In this embodiment, the hardware for interacting with the Ethernet and telephone line are external to the PC and connect via well know serial interfaces.

These systems can be readily adapted by loading appropriate software (i.e., a "softmodem") to incorporate some of the functionality of the Terminal Adapter. This allows the hardware of an existing PC configuration to be adapted to interact with the Network to receive the value added services. In FIG. 9B, one embodiment is illustrated whereby the modem and NIC are integrated into the PC (corresponding to Alternative 1 900 of FIG. 9A).

In FIG. 9B, the PC 900 still incorporates the same POS application 902 and Operating System 904. Minimal changes, if any, are required to use the software enhancement 956. Once the softmodem 956 is loaded, it creates a virtual serial port that receives and sends data to the POS application and Operating System. In essence, the POS application sends data to the software as if it were another serial interface as illustrated via logical path 950. The softmodem recognizes various modem commands and data, and after processing, uses the Operating System to interact with the device drivers. Specifically, the softmodem interacts via a logical path 952 with the device driver 906 connected to the internal modem 910 and interacts via a logical path 954 with the device driver 908 connected to the NIC 912. The modem 910 and NIC 912 are connected to a telephone line 916 and Ethernet 914 respectively. In this manner, the softmodem can use the NIC 912 for conveying a primary communication path using the Ethernet and the modem 910 for conveying a secondary communication path using the telephone line.

An alternative embodiment utilizing a softmodem is feasible even if the PC only has an integrated modem, without a NIC accessing an Ethernet. Similar to the Terminal Adapter having only a telephone interface as a network connection, the PC softmodem can still initiate a secondary communication path using the modem to dial a second telephone number. One advantage of this embodiment is that value added services of the Network can be gained by adapting existing PCs without requiring additional hardware. Some of the above value added services are now examined in detail as they pertain to the Terminal Adapter embodiment. As indicated above, the principles of the present inventions are not limited to the Terminal Adapter embodiment.

Secondary Communication Path

The switch from the primary communication path to a secondary communication path is illustrated in FIG. 10. Specifically, FIG. 10 illustrates a flowchart depicting detecting an error associated with the primary communication path, switching to a secondary communication path, and restoring the primary communication path upon determination that the primary communication path is functioning.

In FIG. 10, the process starts at step 1000. The Terminal Adapter is processing transactions normally using the primary communication path associated with the Ethernet based network interface at step 1002. The system monitors for failures, errors, or anomalies associated with the primary communication path at step 1004. The errors may be of different types. For example, an error could occur at the financial transaction protocol level 1006 as a result of incorrect structure or data. The error could be based at the TCP/IP level 1008 as a result of a failure to receive a response to a message. The error could be based on a physical layer error 1010 as a result of a cut cable. Obviously, a cut cable may trigger errors at other layers. For whatever reason the data cannot be reliably transmitted, the system flow controls the terminals 1012 while it determines whether the secondary communication path is configured 1014. If not, then no further action can be taken 1018. However, under normal conditions, there will be configuration data in the parameter file to configure the secondary communication path. The system retrieves the data, including the telephone number 1016 and originates a secondary communication path using the PPP protocol over a dial-up telephone connection 1020. Once established, the terminal transaction processing can resume 1022. The system also indicates the communication path status via the front panel LEDs 1024 indicating the secondary communication path is active.

The sending of transactions using the secondary communication path is accomplished by altering the routing table for the IP address used to send the transaction. In normal operation, the Terminal Adapter routes the IP address to send a transaction over the primary communication path using the Ethernet network interface (in the embodiment where there are two network interfaces) using the PPPoE or DHCP protocol. Rerouting is accomplished by 'pointing' an IP address to the secondary communication path using the telephone based network interface and the PPP protocol.

The system periodically monitors the condition that triggered the switchover at step 1026. This typically involves sending a 'probe' message over the primary communication path using the Ethernet based network interface. The system has more than one IP address that it obtained via service discovery. While one address is used for transaction processing, the other is used to probe the primary connection. The probe is accomplished by setting up internal TCP/IP tables (ARP and routes) so that probe messages destined for an address not currently used for transaction processing are routed to the primary (Ethernet) interface.

Based on the response or lack thereof from a probe message, the Terminal Adapter may determine that transaction processing should continue at step 1022 using the secondary communication path. If however at step 1026, it is determined that the primary communication path has been restored and is reliable, the transactions are moved to the primary communication path at step 1028 by 'repointing' the IP address to route the data over the Ethernet based network interface. The secondary communication path using the telephone connection can then be terminated 1030 and the probe messaging can be terminated.

In this manner, the Terminal Adapter can provide reliable, redundant transaction processing when a failure occurs associated with the primary communication path.

FIG. 11 illustrates the protocol structure when the Terminal Adapter is using the secondary communication path. The communication between the card reader and the Terminal Adapter is not directly impacted. Thus, the protocol stack in the card reader 1170 interacts with the peer protocol stack in the Terminal Adapter 1175 in the same manner as normal operation (see FIG. 6). Similarly, the interaction of the peer protocol stacks in the Node 1187 and the Financial Transaction Processor Host 1189 is the same. The main difference during use of the secondary communication path is in the communication between the back end of the Terminal Adaptor and the Value Added Client/Services Node (specifically, the left protocol stack of the Node representing the Client Node in FIG. 11).

When the Terminal Adapter receives a message from a terminal, the message is passed down through the value added services layer 1177 via the TCP/IP layer 1178, but now uses a PPP connection over a telephone layer 1179. Because the secondary communication path is a telephone (dial-up) connection 1180, PPP is used since it is a common method of conveying TCP/IP over a dial-up connection. The telephone connection interacts with the telephone network to complete the call to an ISP. The telephone network and ISP are shown as a combined entity 1181, though those skilled in the art will realize that there is a conversion at some point from a physical telephone connection 1180 to another type of physical connection 1182. This conversion is performed transparently to the Node, and the only requirement is that the physical layer 1183 in the Node corresponds to the protocol used by the Internet provider 1181. Once the message is in the Node, the information flows up from the physical layer 1183 to the TCP/IP layer 1184, but in this case the PPP protocol is not likely to be used, since it is not likely that a dial-up connection is used between the Node and the Internet. The added services layer 1185 ensures that transactions are seamlessly continued using the secondary communication path using the aforementioned security, authentication, and encryption procedures. The data is relayed to the financial transaction protocol layer 1186 where it continues on its way to the Host.

In this situation, the Services Node (again represented as a combined Client/Service Node) may be a physically different node than used in conjunction with the primary communication. Further, the Client Node may detect the existence of a new connection and notify the NOC of the situation. In this manner, the NOC is able to detect when a given Terminal Adapter is operating in backup mode. Additionally, different or additional Core Nodes may be used to route the Transaction to the Host.

At this point, the Terminal Adapter indicates the change in status of the primary communication path operation via LEDs or other form of visual indications. LEDs are one embodiment for providing users with a visual indication of the status of the primary and/or secondary communication path. The terminal also updates a status indication associated with each communication path. This status indication may be used by the Terminal Adapter to direct transactions to the primary or secondary communication path.

During the time in which the secondary communication path is utilized the Terminal Adapter is also sending 'probe' messages over the primary communication path to determine whether the connection is available. The criteria used to determine whether it is available may vary. For example, the Terminal Adapter may have an error counter within a moving window for determining that the primary communication path is unacceptable for conveying transactions. In this situation, the probe messages may result in responses that are monitored for errors. Alternatively, the error causing the switchover may be a total lack of operation on the primary path and any response to a probe message may indicate that the primary communication path is available. Once the primary path is restored, the Terminal Adapter communicates the transaction using the primary communication path and the secondary path is terminated. The change in status is reflected in the LEDs and internal tables as appropriate.

In some installations, the Terminal Adapter may access the Network with the primary communication path associated with a dial-up network connection. In this case, there is still a form of secondary communication path, but this relies on a dial-up connection using the same telephone line, but to a different telephone number. In this circumstance, the secondary communication path does not provide communication when certain faults occur (e.g., a cut telephone line).

However, faults frequently occur in the ISP and are more likely than a failure of the telephone line or telephone network. In this situation, an alternative dial-up connection can be established to an alternative access point of the same ISP or to an alternative ISP. In this manner, when the Terminal Adapter dials a second back up telephone number, it bypasses the original fault. This could result in an alternative Client Node serving the Terminal Adapter. Another embodiment involves the Terminal Adapter establishing a direct dial-up connection to the Client Node.

When dial-up is used for both primary and secondary communication paths (i.e., the primary and second communication paths use a common network interface), the Terminal Adapter is unable to determine when the primary communication path is restored. This is because the 'probe' messages cannot be sent out, since the phone line is dedicated for backup access.

The NOC becomes aware when the Terminal Adapter is operating using the secondary communication path, and monitors the various conditions, including the event causing switchover on behalf of the Terminal Adapter. For example, if a link between the ISP and Client Node fails, the Terminal would switch to the secondary communication path, bypassing the failed link. The NOC is aware of the link failure, and when the link is restored, the NOC directs the Terminal Adapter to terminate the secondary communication path and reinitiate communication using the primary communication path. There are a variety of techniques for effecting NOC to Terminal Adapter communication and one approach involves using the capabilities of downloading new configuration parameters and code discussed herein.

Automatic Protocol Configuration

FIG. 12A illustrates one embodiment of the Terminal Adapter determining the appropriate protocol to use for a given terminal and the host to which the transaction should be sent. Terminals may use a variety of protocols, but typically use an industry standard or proprietary protocol for card authorizations. Common industry protocols include VISA-I and VISA-II for card readers and ATM machines, as well as internationally recognized protocols, such as ISO 8583.

At a high level, two techniques are generally relevant to determining the terminal protocol, the appropriate transaction type message, and the service name (address) associated with the transaction. These techniques are parsing and telephone number mapping. How these are used, depend in part, on the Host capabilities. Specifically, some Hosts may only recognize simple transaction types. In this case, each terminal accessing that Host is presumed to only require simple transaction type messages. Consequently, every message is mapped to a simple transaction message once the destination host is determined. Other Hosts may recognize and require both simple and session transactions. In this case, the Terminal Adapter must select the appropriate transaction request message when conveying a terminal transaction. Since most transactions are of the simple type, the Terminal Adapter in some instances presumes simple transactions are used, unless exception processing indicates a session transaction should be used.

In one embodiment, the Terminal Adapter and Host only sends/accepts simple transactions. The Terminal Adapter only has to recognize the protocol type (e.g., VISA-I or VISA-II) and the destination Host. One method for the Terminal Adapter to determine the protocol used by the Terminal is based on the telephone number dialed by the terminal. For example, in FIG. 12A, the card reader 2 is programmed to dial a defined number. The Terminal Adapter processes the dialed number using table 1290. Table 1290 contains a column 1291 for each defined telephone number, a column for the associated protocol type 1224 and a column for the appropriate service name 1293. In this example, a geographical area may be served by two host processors as identified by the names 'fubar.1' and 'fubar.2'. Each service name can be associated with either the VISA-I or the VISA-II protocol. Thus, there are four telephone numbers 1294, 1295, 1296, 1297 that are entered into the table; one for every combination. For example, dialing 404-555-1235 1295 will result in the Terminal Adapter using the VISA-2 protocol and addressing the request to the 'fubar.1' host.

The Terminal Adapter must still parse the message to extract the relevant information and copy this into a simple transaction request message. This message is sent to the Client Node in the Network using routing tables to route the message to a specific Service Node. In this manner, the Terminal Adapter can easily automatically configure itself to use the appropriate protocol and select a host on the dialed number. Once at the Service Node, the transaction is then routed to the appropriate Host.

Another method wherein the Terminal Adapter determines the appropriate Terminal protocol is illustrated in FIG. 12B. This method is based on defined parsing rules and presumes the terminal and host can send/receive either simple transactions or session transactions. Typically, the vast majority of transactions are simple transactions with only a few instances requiring session transactions. When a terminal establishes a connection with the Terminal Adapter (e.g., dials a telephone number and an active connection is established), the Terminal Adapter 14 sends an "ENQ" or Enquiry message 1298 to the Terminal. The Terminal will respond by sending a message 1299 that includes a predefined ASCII string. Based on the type of protocol implemented in the terminal, the message string will have certain characteristics. For example, the message string will be one of several lengths with certain values at the beginning and/or end. For example, one rule is:

(STARTS-WITH("T.") OR STARTS-WITH("E.")) AND LEN(32) AND ENDS-WITH("98").

This rule examines the message from the terminal and determines the starting ASCII character, the length, and the last two characters. If the conditions match, then a table lookup indicates the protocol type, message type, and host address. In this case, the Terminal Adapter maps a message starting with an ASCII "T." or "E." that is 32 bytes long and ends with an ASCII "98" to a Session Initiate transaction request message 1289 using the "fubar.1" service name. This requires the Terminal Adapter to implement more sophisticated parsing rules to recognize every type of message for every type of protocol that can be received. One approach to simplify the parsing rules is to presume every terminal message maps to a simple transaction type unless the format indicates otherwise in some manner. In this case, exception processing can be used to simplify the parsing rules.

FIG. 12C illustrates the processing of the parsing rules of one embodiment in further detail. The process starts in step 1220 with retrieving the parsing rules 1221. There are rules to recognize various messages, and a first rule is selected in step 1222. The start of the string is tested for validity 1224 and if no match, the next rule is applied 1225 and the process starts over. Otherwise, the end of the string is tested for validity 1226 and if so, it is tested for a match 1227. If no match, then the next rule is applied 1225 and the process repeats. Otherwise, the length is tested for validity 1228 and if a match occurs 1229, then the message is recognized 1231 and the process is completed 1233, otherwise the next rule is applied 1225 and the process repeats. If no matches occur or the string is found invalid, and there are no more rules 1230, then the message is not recognized 1232 and an error exists. The parsing for the string is completed at step 1233.

While this approach requires a rule for every message, it does offer certain advantages over the telephone mapping approach. Specifically, it does not require administration of different telephone numbers in the card readers in order to direct transactions to different locations. However, using either technique, the Terminal Adapter can automatically recognize a plurality of protocols used by different terminals, and determine the appropriate message type and service host.

Service Discovery, Parameter and Software Download

The concepts of service discovery, parameter download, and software download are closely related. Service discovery is the process by which the terminal adapter discovers the IP addresses for Nodes that can provide further information, such as the parameter file. Parameter file downloading involves receiving a file containing configuration parameters. A configuration version number describes this file. The software download allows new software to be downloaded into the Terminal Adapter and uses address and other parameters obtained in the parameter file. All three procedures rely on the Terminal Adapter interacting with a Network, but with different degrees of autonomy.

Downloading parameters or software into the Terminal Adapter facilitates remote correction of software bugs as well as software deployment to interact with new services with the Network. Terminal Adapters can be updated without requiring manual replacement of Terminal Adapters, or manual replacement of a portion of memory chips, such as one or more read-only-memory (ROM) chips in the Terminal Adapters, or manual loading of new software. Updating can be done remotely, at convenient times, with minimal cost and interruption in service. The updating of software is controlled in part by the NOC. The NOC is the portion of the Network that maintains tables associating each Terminal Adapter with its parameters.

The Terminal Adapter boot software of one embodiment comprises two separate programs referred to as DLM (Download Program Manager) and DLP (Downloaded Program). The Terminal Adapter may be factory programmed with the DLM only, and the DLP may be downloaded from the Network after the Terminal Adapter is installed in the client's premises. The DLP is typically stored in non-volatile memory, but in case of a failure of the non-volatile memory, the hardcoded DLM allows recovery. In addition to the DLM, every Terminal Adapter is generally factory programmed with various parameters to allow it to initially connect to the Network. As previously discussed, these parameters typically include: the Terminal Adapter Identification Number, the secret or private encryption key, and the Configuration Service Name. These parameters (except for the Configuration Service Name) can be superceded by obtaining dynamically obtained values, though doing so does not erase the programmed values. For example, the Terminal Adapter knows that absent a dynamically obtained Service Name stored in non-volatile memory, the default, programmed value is to be used.

The purpose of the DLM is to download and run the latest version of firmware (DLP) that is stored in non-volatile memory. The basic operation of the DLM of one embodiment is illustrated in FIG. 13A and described in the following steps starting from a system reset or initial powering up.

In FIG. 13A, the process begins with powering up the Terminal Adapter 1350, which is the same as resetting the unit. Upon the very first time of being powered up, there are no dynamic parameters stored in flash (non-volatile) memory. Thus, only the default programmed values exists. Using the Service Discovery procedure 1352 and the default Configuration Service Name, the Terminal Adapter obtains at least one TCP/IP address for a Client Node to interact with. In step 1353, a TCP connection is established using the Ethernet to access the Network, or using PPP over a dial-up telephone line. The Terminal Adapter is programmed with a default parameter file version (specifically, version zero, indicating a default parameter file is present and signifying that all the parameters are default values). In step 1354, the Terminal Adapter fetches the parameter data from the Configuration Server. This is done by the Terminal Adapter (specifically, the DLM) indicating its parameter file version number to the Network, and the Network responding with a more recent version followed by the parameter file. The Network will only send the parameter data if the Terminal Adapter parameter file version is not the same as the version value stored in the server database. In this example, the Network knows that the version sent by the Terminal Adapter (version zero) indicates a default parameter is present in the Terminal Adapter, indicating that no prior parameter downloads have occurred.

If the Terminal Adapter already has the current version, the Network will return the same parameter file version number. This informs the Terminal Adapter that it has the latest parameter file and reduces unnecessary transmission of network data. If the Terminal Adapter previously had downloaded parameters, but these were corrupted, the parameters can be requested from the server by sending a version number zero in the packet. Any received data is saved to non-volatile flash memory in step 1356.

Next, at step 1358, the Terminal Adapter of this embodiment (using the DLM) checks the current DLP version indicated in the parameter file and compares it against the version that it is currently executing. It further checks to ensure the data is not corrupted (i.e., free from errors as detected by a cyclic redundancy check or similar mechanism). If present and uncorrupted, the DLM skips to executing the DLP application in step 1368, which then completes the process at step 1370. If instead, the DLP version is not current, then step 1360 is performed to obtain the must current version. The Terminal Adapter retrieves an address from the parameter file and connects to the IP address for the purpose of performing a file transfer using FTP at step 1360. The Terminal Adapter then downloads the more recent DLP program at step 1362. If the download is not correct, at step 1364, then it resets itself at step 1366 and repeats the process. If the download is correct at step 1364, then the new DLP program is executed at step 1368 and the process is completed at step 1370.

The DLP program is the main application program running on the Terminal Adapter and performs the financial transaction processing and interworking. It uses the same parameters (see FIG. 13B) as used by the DLM. The DLP can, however, have a different Service Name based on a dynamically obtained value, as the DLM process uses the value hard coded in the firmware. Advantageously, the DLP periodically checks if there is a more current parameter file, and if any parameters have changed or a new DLP is needed, the DLP performs a reset and the process repeats as described above. Thus, the DLM only performs one parameter file fetch, obtains the DLP, and then executes the DLP. The DLP then periodically performs the parameter file fetch. Only if the DLP resets the Terminal Adapter does the DLM execute itself. However, in this case, the DLM will observer that various dynamically assigned parameters are present in flash memory and it will utilize those values over the embedded values, skipping some of the above identified steps.

Thus, obtaining new parameters and new application code are closely related, but the capability exists to download new parameters without having to download new application code. Once the DLP is executing, it will periodically check with the Network to determine whether it has the most current parameter file version. The Network responds by downloading a new parameter file when a newer parameter version is appropriate. One parameter in the file is an indication of a new DLP, which triggers the DLP to initiate a file transfer. In this manner, the Network can control the loading of new parameters and software.

The contents of the parameter file of one embodiment are illustrated in FIG. 13B. The first parameter in the file is Configuration Version 1300. This value indicates the current parameter file version the Terminal Adapter should have stored in memory. This could incorporate a timestamp to signify the last version obtained. The Terminal Adapter periodically queries the Network as to what is the current version that the Terminal Adapter should be executing. If the Network requires downloading a new parameter file, it returns the current version present in the Terminal Adapter. Otherwise, the NOC returns a more recent parameter file version value as well as the full parameter file. In addition, the NOC can append management commands to control the Terminal Adapter indicating it to reset or switch communication paths.

The frequency with which the Terminal Adapter checks the Configuration Version 1300 is determined by the Configuration Fetch Interval 1301, typically expressed in seconds. This parameter is set to have the Terminal Adapter check its parameter file version every hour or so, although greater or lesser time intervals may be used. Because the downloading of new code suspends the normal operation of the Terminal Adapter, the Terminal Adapter may forego a periodic download, particularly if there are financial transactions underway. The "Maximum Skip Configuration Register" 1302 indicates the maximum number of times the Terminal Adapter may skip requesting the current parameter version. This value should not be exceeded by the Terminal Adapter regardless of the number of pending transactions.

The periodic checking for a new parameter file version also functions as a 'heartbeat' indication from the Terminal Adapter to the Network. The Node receiving the parameter file request forwards the indication to the NOC, allowing the NOC to update its status tables for that Terminal Adapter. Thus, the receipt of a parameter file request by a Terminal Adapter indicates to the NOC that the Terminal Adapter is functioning. If the terminal has not requested its current parameter file version and the maximum skip interval is exceeded and has not initiated any transactions, then the NOC knows the Terminal Adapter is not functioning. In such a situation, the NOC can initiate another process, such as issuing a notification to a predefined destination in a predefined manner for that Terminal Adapter. For example, the notification may be an e-mail to a network administrator associated with the business entity operating the Terminal Adapter identifying the malfunctioning Terminal Adapter. Alternatively, the NOC could initiate a page, a pre-recorded telephone call, or send an alarm message to a system, file, terminal or printer in the NOC. In this manner, the NOC can proactively react to a non-functioning Terminal Adapter. Similarly, the Network may also monitor transaction usage, errors, or other conditions and report these to the NOC, which initiates a similar notification.

If software download is required based on an updated binary image name (DLP version number), the Terminal Adapter will initiate the request using File Transfer Protocol (FTP), a well known means for transferring files over the Internet. The address for making the request is obtained from the parameter file as well as required identification and security information. The FTP information 1330 comprises a URL, Port number, User Name, and Password.

The User Name identifies the Terminal Adapter, and an alternative embodiment could use the Terminal Adapter Identification Number. The Password data authenticates the user as being authorized to receive the binary DLP file.

Since FTP information is transferred without being encrypted using a TCP/IP connection to the Terminal Adapter, other embodiments are disclosed providing greater security. One approach is to communicate a 'challenge' based on a random value to the Terminal Adapter. The Terminal Adapter concatenates the challenge value with its secret key and computes a Message Digest 5 value to determine a password. The Terminal Adapter sends this value to the Network that has compared a similar value based on the Network's knowledge of the Terminal Adapter's secret key. If the two values match, the Terminal Adapter is authenticated.

Another variation to ensure secure file transfer is to use the secure data transfer service of the Network. Specifically, a Session Transaction is used to communicate the file in an encrypted manner. The Terminal Adapter and Network use the same encryption methods as for passing transactions originating from a terminal to a host. Various authentication and encryption schemes can be used to effect the file transfer to an authenticated Terminal Adapter, such as using secure FTP procedures.

The parameter file of FIG. 13B also includes other parameters, including communication parameter information 1303, binary file characteristics 1304, service discovery information 1305, primary communication information 1307, and backup communication information 1309. The communication parameters 1303 indicate the type of 'back-end' interface currently used by the Terminal Adapter (e.g., Ethernet, secondary ISP, etc.). This value is included by the Terminal Adapter with every parameter file fetch request and indicates to the Network the current network interface used by the Terminal Adapter. In this manner, the Network is able to monitor the communication path status of each Terminal Adapter.

Other information includes the binary image file (DLP program) characteristics 1304 including the name, size and error checking information that the Terminal Adapter should be currently using. The Service Discovery information 1305 indicates to the Terminal Adapter where terminal transactions should be directed to, typically in the form of a URL. In turn, the Client Node in the Network maps the host name to a URL, which in turn is resolved using the DNS service into an IP address. In this manner, the actual IP addresses are 'hidden' from the Terminal Adapter, allowing Network changes in address to transparently occur. This could be similarly accomplished by providing the Terminal Adapter a URL, but if the terminal indicated a single URL, then all traffic would be routed to that single point of interconnection. Since the Client Node maps the service to a URL, the Client Node may select one of several URLs based on geographic location, load capacity (e.g., transaction processing capacity), or other network management aspects. In this manner, diverse Host processors connected to separate Service Nodes may be used to provide seamless transaction services to the Terminal Adapter. Further, this approach never 'exposes' the host network addresses and thus provides added security and flexibility.

The parameter file also contains primary communication path information 1307 including the telephone number of the primary ISP and any associated modem commands (this is only required if primary access is via dial-up), identification and password information. Additional control information regarding the PPP settings is included. Similarly, secondary or backup communication path information 1309 is provided.

Illustration of Operation

The overall operation of the system is illustrated in FIG. 14, which is one embodiment and illustrates a subset of the elements that may be involved during normal operation.

A card reader 2 is plugged into a Terminal Adapter 14 wherein the Terminal Adapter has access to the Internet 26 via a primary communication interface 16. The Terminal Adapter also has a secondary communication interface 22 using a POTS telephone line 19*a* connected to the Telephone Network 24. The Terminal Adapter is powered on and determines that it does not have a current application program loaded. It examines its default Service Discovery Address information, which is programmed into the Terminal Adapter at time of manufacture, and it uses this information to fetch an updated Service Discovery Address. The Terminal Adapter then uses this information to synchronize and authenticate itself to the Network. After this has occurred, it uses a simple transaction to obtain a dynamically determined service name that it queries to obtain a current parameter file setting. One parameter in the file indicates the current software code that should be present and the Terminal Adapter determines whether it should initiate a file transfer to obtain the current software. It then downloads the information using the FTP address information in the parameter file.

Once this is accomplished, the Terminal Adapter is prepared to handle terminal transactions. It synchronizes its transaction counter (if required) with the Client Node 25*a* and is authenticated by the Client Node using the aforementioned techniques. The authentication procedures also provide a session token to the Terminal Adapter allowing proper encrypting and decrypting of transactional information. Once completed, the Terminal Adapter is ready to process transactions from the Card Reader 2.

In this illustration, upon detecting a card swipe, the Card Reader 2 initiates a phone call and the Terminal Adapter emulates the necessary telephone signals so that a connection is established between the card reader and Terminal Adapter. From the card reader's perspective, it appears to have established a telephone call. The Terminal Adapter queries the Card Reader using an ENQ (e.g., ASCII ENQ character) message to solicit a response message. Upon receipt of the response message, the Terminal Adapter parses the message and selects the appropriate protocol for interacting with the Card Reader. The Terminal Adapter also selects an appropriate service name that identifies a destination Host processor and transaction type, which is a simple transaction type in this illustration.

Continuing the illustration, the Terminal Adapter maps the transaction to a simple transaction protocol on an established TCP/IP connection and sends the message to the Client Node 25*a*. The Client Node processes the transaction to ensure that the transaction is allowed, synchronized, authorized, error free, and determines the appropriate Node to which to forward the request to. This decision is based on the host name selected by the Terminal Adapter in the simple transaction protocol. The Client Node selects a route to forward the transaction based on, in part, the service name, link capacity, configuration, and processor loading. Assuming it is forwarded directly to a Service Node 25*b*, the Service Node 25*b* then forwards the transaction to the Financial Transaction Processor 36 according to the protocol used to interconnect the Host 36 and the Service Node 25*b*. The Host and Service Node are directly connected via a private line 34. The message typically is decrypted prior to communication to the Host. The Host receives the card authorization request, responds, and the response is returned to the Service Node that typically encrypts the information and routes the response back to the Client Node 25*a*, then to the Terminal Adapter 14, and then the card reader 2. This illustrates some aspects of a normal card authorization procedure.

Assuming now a failure associated with the Internet access on the primary communication path using the primary network interface 16 (e.g., the connection has broken), the Terminal Adapter recognizes the failure by various means (e.g., lack of response at TCP/IP layer or loss of electrical signals at the physical layer). The Terminal Adapter retrieves the secondary communication path parameters from its parameter file in non-volatile memory, and initiates a dial-up connection to the ISP using the telephone number as well as appropriate identification and password information. Referencing FIG. 14, the dial-up connection travels from the telephone line 19*a* through the telephone network 24 and then via an alternative connection 19*b* to the Client Node 25*a*. The Client Node reached may be the same or different from the one previously associated with the primary communication path. The Terminal Adapter must resynchronize the transaction counter, identify and authenticate itself before proceeding with transaction processing. The Terminal Adapter also updates its internal communication path status table and LED status indicators accordingly. Since the Client Node is aware of the establishment of the secondary communication path, it notifies the NOC 29 of the failure. The NOC then updates its status tables and then notifies the appropriate systems and/or personnel that the primary connection has malfunctioned.

Periodically, the Terminal Adapter sends a 'probe' message over the Ethernet interface using the primary communication path to determine if it is functional. In this illustration, the Terminal Adapter uses an Ethernet access to the Internet in conjunction with the primary communication path and dial-up access to the Internet in conjunction with the secondary communication path. Because separate physical access methods are used, the Terminal Adapter can send a 'probe' message to determine whether Internet access using the Ethernet access approach is restored while using the dial-up access for completing transactions.

This scheme must be modified if a single telephone line is used to establish a first connection using a first telephone number for the primary communication path and a second connection using a second telephone number for the secondary communication path. That is because the primary communication path cannot convey a probe message while the telephone line is used to support the secondary communication line. Of course, more sophisticated telephony services such as ISDN allow two connections to exist on one telephone line, as do other telephony based services. Typically, only one communication path can be operational using a single telephone line and the NOC will indicate in response to a parameter file version request that the problem causing the primary communication path to be inoperable has been corrected and that the Terminal Adapter should switch back to using the primary communication path.

If a response is received on the primary communication path access using the Ethernet, this indicates the communication path is restored. The Terminal Adapter switches back to conveying transactions on the primary connection. Of course, prior to conveying transaction requests, the Terminal Adapter must first synchronize and authenticate itself on the primary communication path. Correspondingly, the NOC is aware of when the switchback occurs. The Terminal Adapter also updates its communication status visually using LEDs, in order to facilitate local diagnosing of communication status. The Terminal Adapter updates its operational status tables regarding the primary and secondary communication paths.

Periodically, the Terminal Adapter 14 requests from the Client Node 25*a* what parameter file version it should be executing. This is accomplished using a simple transaction request message that includes the Terminal Adapter's identification number and communication path status. The Client Node forwards this message to the NOC. As a result, the NOC is now aware of the operational status of the Terminal Adapter. The NOC responds to the Client Node with a parameter file version number, and the Client Node forwards the parameter file version number to the Terminal Adapter. Assuming that the version number in the response matches the version number in the Terminal Adapter, the Terminal Adapter continues operating normally. If the NOC responded with a newer version number, it would indicate that at least one parameter in the file had changes and would send the parameter file as well. The Terminal Adapter would examine the parameter file, and if the DLP binary image name was different, the Terminal Adapter would fetch the current software, load it, and then execute it.

In this manner, the Terminal Adapter is able to automatically interconnect a variety of Terminal Types, which may implement various protocols based on the destination host. The Terminal Adapter in conjunction with the Network ensures a reliable and secure communication capability is provided between the Terminal and Host. Should the primary communication path fail, the Terminal Adapter uses a secondary communication path, and automatically restores the primary communication path when available. The NOC is aware of the operational status of each Terminal Adapter, and provides alarm notifications as appropriate. Further, by the Client Node mapping the service name associated with transaction requests to a particular Service Node, the Network is able to route traffic to a selected Host based on various conditions. In this manner, the Terminal Adapter operating in conjunction with the Nodes 25 is able to provide a versatile and flexible transaction oriented network service.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A terminal adapter interworking at least one point of sale terminal comprising a card reader with a network comprising:

at least one terminal interface capable of connecting the point of sale terminal and receiving a first transaction request message generated in response to the card reader obtaining data from a card;

a processor capable of receiving the first transaction message and determining the contents of the first transaction message, formulating a second transaction message that is encrypted and incorporating transaction synchronization information, wherein the processor transfers the second transaction message using either a first or second communication path according to information contained in a communication path status table wherein the processor previously determined the information contained in the communication path status table based on processing of previously received messages, wherein if the processing determines an error at the financial transaction protocol layer, the information in the communication path status table is set to indicate the secondary communication path should be used; associated with a transaction memory capable of storing the communication path status table indicating the operational status of the first communication path; and a first network interface connecting the terminal adapter to the network and establishing the first communication path that is used to send the second transaction message.

2. The terminal adapter of claim 1 further comprising a second network interface connecting the terminal adapter to the network and establishing the second communication path for sending the second transaction message.

3. A terminal adapter interworking a plurality of terminals to a network interface comprising:

a plurality of terminal interfaces each capable of receiving a first transaction request message from one of the plurality of terminals wherein the one of the plurality of terminals has an integrated card reader and initiates the first transaction request message in response to reading a card;

a processor receiving the first transaction request message, parsing the contents of the first transaction request message, generating a second transaction request message that is based in part on the contents of the first transaction request message, checking the status of a first communication pat associated with a first network interface wherein the status is based on processing associated with a previously received transaction request message, sending the second transaction request message using the first communication path if the status of the first communication path is operable, and sending the second transaction request message using a second communication path if the status of the first communication path is inoperable and a memory for storing a communication path status table accessed by the processor to determine the status of a first communication path, wherein the processor previously determined information contained in the communication path status table based on processing of previously received messages, wherein if the processing determines an error at the financial transaction protocol layer, the information in the communication path status table is set to indicate the secondary communication path should be used.

4. The terminal adapter of claim 3 wherein the second transaction request message further comprises a terminal adapter identification number.

5. The terminal adapter of claim 3 wherein the second transaction request message further comprises an error detection mechanism.

6. The terminal adapter of claim 3 wherein the second transaction request message is encrypted using information previously obtained by the terminal adapter using the first network interface.

7. The terminal adapter of claim 3 further comprising a visual status indicator controlled by the processor indicating the status of the primary communication path.

8. The terminal adapter of claim 3 further comprising a visual status indicator controlled byte processor indicating the status of one of the plurality of terminal interfaces.

9. The terminal adapter of claim 3 wherein the processor further determines a host transaction processor to process the second transaction request message by parsing the first transaction request message, using parsing rules to identify an address for the host transaction processor.

10. The terminal adapter of claim 3 wherein the second transaction request message further contains a transaction counter used to synchronize the second transaction request message to a network connected using the first or second network interface.

11. The terminal adapter of claim 3 further comprising a memory storing a first address obtained by the terminal adapter by requesting a plurality of addresses upon initialization of the terminal adapter wherein the first address is further contained in the second transaction request message.

12. The terminal adapter of claim 3 further comprising a memory storing a parameter file version number wherein the parameter file version number is further conveyed by a third transaction request message.

13. The terminal adapter of claim 3 wherein the processor is capable of sending a third transaction request message indicating a parameter file version number of a first parameter file currently stored in a memory of the terminal adapter and receiving in response a second parameter file that is stored in non-volatile memory.

14. The terminal adapter of claim 13 wherein the second parameter file includes a software version parameter and wherein the processor is capable of initiating a file download request, receiving the file, storing the file in men-wry, and executing the contents of the file based on the value of the software version parameter.

15. A terminal adapter comprising:
a plurality of dial-up input ports, each input port incorporating an RJ-11 telephone connector and capable of emulating a plain-old-telephone-service (POTS) interface for interfacing a point-of-sale device using an asynchronous communication protocol based on the VISA-II protocol, each dial-up input port further capable of receiving a first message sent from the point-of-sale device generated in response to reading a credit card;
a first communications path using a first interface for interfacing the terminal adapter to the Internet using in pan an if-based communication protocol;
a second communications path using a second interface for interfacing the terminal adapter with a telephone network, the second interface operatively connected to a modem incorporated internally in the terminal adapter; and
a processor, operatively connected to receive the first message from one of the plurality of dial-up input pans, the processor generating a second message addressed to a credit card authorization processor, the processor directing the second message based on information in a communication path status table to either the first communication pat if the first communication path is determined to be operative or the second communication path if the first communication path is deemed to be inoperative wherein if processing of previously received messages determines an error at the financial transaction protocol layer, information in the communication path status table is set to indicate the first communication path is inoperative.

16. The terminal adapter of claim 15 wherein the second communication path uses Point-to-Point-Protocol (PIP) to communicate over the telephone network with the credit card authorization processor.

17. The terminal adapter of claim 15 wherein the first communication path uses Ethernet to communicate over the Internet with the credit card authorization processor.

18. The terminal adapter of claim 15 wherein the second message is encrypted prior to sending it to the credit card authorization processor.

19. The terminal adapter of claim 16 wherein the modem uses a V.34 communications protocol.

20. The terminal adapter of claim 15 wherein the IP-based communication network is based on a TCP/IP protocol.

21. A method of a terminal adapter interworking a point of sale terminal with a network, the terminal adapter comprising:
reading a credit card by a point of sale terminal;
sending a first transaction message by the paint of sale terminal based on the VISA-II protocol requesting authorization of a charge on the credit card;
receiving the first transaction message on one of a plurality of serial interfaces on the terminal adapter, the one of plurality of serial interfaces emulating a modem interface with respect to the paint of sale terminal;
the terminal adapter generating a second transaction message comprising encrypted data based on the first transaction message, the second transaction message directed to a credit card transaction processor, the second message conveyed using an IP based protocol;
determining whether a first communication path providing communication to a credit card processor over the Internet is operative by accessing a communication path status table indicating the operational status of the first communication path, the operational status of the first communication path being determined based on processing of previously received messages, wherein if the processing determines an error at the financial transaction protocol layer, the communication path status table is set to indicate the first communication path is inoperative; and
based on the communication path status table, sending the second transaction message either over the first communication path if the first interface is operative, or establishing a second communication path using a point-to-point connection for sending the second transaction message over a second interface connected to a telephone network if the first communication path is inoperative.

* * * * *

(12) EX PARTE REEXAMINATION CERTIFICATE (7280th)
United States Patent
Ofir et al.

(10) Number: US 7,219,149 C1
(45) Certificate Issued: Dec. 29, 2009

(54) VERSATILE TERMINAL ADAPTER AND NETWORK FOR TRANSACTION PROCESSING

(75) Inventors: Jacob Ofir, Richmond Hill (CA); Mark A. Symmes, Schomberg (CA)

(73) Assignee: Datawire Communication Networks Inc., Toronto, Ontario (CA)

Reexamination Request:
No. 90/008,793, Aug. 8, 2007

Reexamination Certificate for:
Patent No.: 7,219,149
Issued: May 15, 2007
Appl. No.: 10/461,175
Filed: Jun. 12, 2003

(51) Int. Cl.
*G06F 15/173* (2006.01)
*G06Q 2/00* (2006.01)

(52) U.S. Cl. .............................. 709/224; 705/21; 705/39; 709/220

(58) Field of Classification Search .................... None
See application file for complete search history.

(56) References Cited

U.S. PATENT DOCUMENTS

| | | |
|---|---|---|
| 5,526,409 A | 6/1996 | Conrow et al. |
| 5,621,731 A | 4/1997 | Dale et al. |
| 6,763,479 B1 | 7/2004 | Hebert |
| 6,886,742 B2 | 5/2005 | Stoutenburg et al. |
| 6,990,470 B2 | 1/2006 | Hogan et al. |
| 7,233,920 B1 | 6/2007 | Rodriquez, Jr. et al. |
| 2002/0055909 A1 | 5/2002 | Fung et al. |
| 2002/0095495 A1 | 7/2002 | Otsuka et al. |

FOREIGN PATENT DOCUMENTS

WO   WO 9858356 A2   12/1998

*Primary Examiner*—B. James Peikari

(57) ABSTRACT

A terminal adapter, along with a value added network, is disclosed that interworks a plurality of terminals with a processing host to accomplish transaction processing. The terminals can use different protocols and typically incorporate card readers for completing financial or other types of transactions typically involving credit, debit, ATM or similar cards. The terminal adapter provides reliable and secure communication using a network based in part on the Internet as a primary form of communication. The terminal adapter also provides a secondary communication path in the event of a failure of the primary communication path, as well as automatic recognition of different terminal protocols, various security functions, error detection, and other network administration functions to ensure a flexible system and efficient transaction processing system.

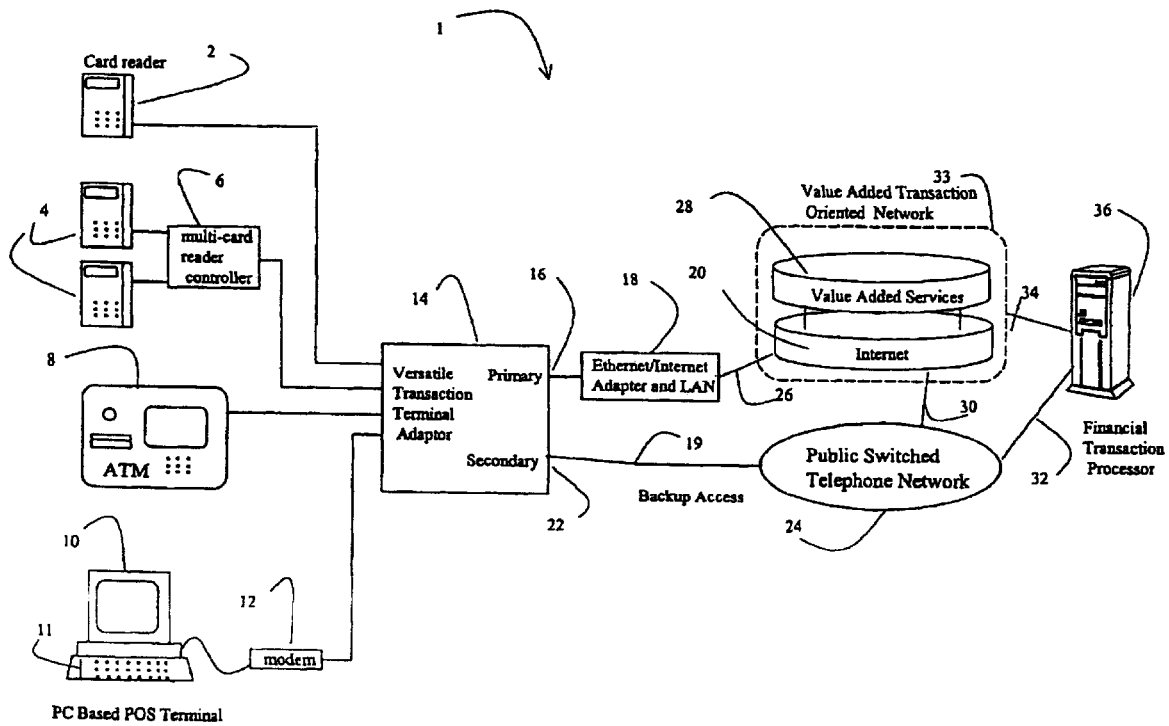

US 7,219,149 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21 is confirmed.

New claims 22–39 are added and determined to be patentable.

22. *The terminal adapter of claim 1, wherein the processor is further configured to determine the information contained in the communication path status table based on a failure to receive a message.*

23. *The terminal adapter of claim 22, wherein the failure to receive the message comprises failure to receive a response to a message transmitted by the terminal adaptor.*

24. *The terminal adapter of claim 1, wherein the processor is further configured to determine the information contained in the communication path status table based on a TCP/IP level error.*

25. *The terminal adapter of claim 1, wherein the processor is further configured to transmit probe messages over the first communication path during a time when the secondary communication path is being used, the probe message transmitted to determine whether the first communication path is restored.*

26. *The terminal adapter of claim 3, wherein the processor is further configured to monitor the first communication path to determine whether the first communication path is restored, the monitoring occurring during a time period when the communication path status table is set to indicate the secondary communication path should be used.*

27. *The terminal adapter of claim 26, wherein the processor is further configured to modify the communication path status table to indicate the first communication path should be used, the modifying occurring in response to a determination that the first communication path is restored.*

28. *The terminal adapter of claim 26, wherein the processor is configured to perform the monitoring of the first communication path by transmitting probe messages over the first communication path.*

29. *The terminal adapter of claim 28, wherein the processor is configured to determine whether the first communication path is restored by monitoring responses to the probe messages using an error counter within a moving window.*

30. *The terminal adapter of claim 28, wherein the processor is further configured to determine whether the first communication path is restored by monitoring for a first response to the probe messages, wherein a failure causing switchover to the secondary communication path was a total lack of operation.*

31. *A terminal adapter interworking a plurality of terminals to a network interface comprising:*

*a plurality of terminal interfaces each capable of receiving a first transaction request message from one of the plurality of terminals wherein the one of the plurality of terminals has an integrated card reader and initiates the first transaction request message in response to reading a card;*

*a processor receiving the first transaction request message, parsing the contents of the first transaction request message, generating a second transaction request message that is based in part on the contents of the first transaction request message, checking the status of a first communication path associated with a first network interface wherein the status is based on processing associated with a previously received transaction request message, sending the second transaction request message using the first communication path if the status of the first communication path is operable, and sending the second transaction request message using a second communication path if the status of the first communication path is inoperable; and*

*a memory for storing a communication path status table accessed by the processor to determine the status of a first communication path, wherein the processor previously determined information contained in the communication path status table based on processing of previously received messages, wherein if the processing determines an error at the financial transaction protocol layer, the information in the communication path status table is set to indicate the secondary communication path should be used, and wherein the processor is further configured to transmit probe messages over the first communication path to monitor whether the first communication path is restored during a time when the secondary communication path is being used.*

32. *The terminal adapter of claim 31, wherein the processor is configured to:*

*determine that the first communication path is unreliable based on a received response error at the financial transaction protocol layer to the first transaction request message transmitted from the terminal adapter.*

33. *The terminal adapter of claim 31, wherein the processor is further configured to:*

*determine whether the first communication path is reliable based on a failure to receive a response to the first transaction request message transmitted from the terminal adapter.*

34. *The terminal adapter of claim 31, wherein the processor is further configured to:*

*determine the first communication path is unreliable based on a TCP/IP level error resulting in a failure to receive a response; and*

*configure the secondary communication path based on the determination.*

35. *The terminal adapter of claim 31, wherein the processor is further configured to:*

*determine the first communication path is unreliable based on a physical layer failure; and*

*configure the secondary communication path based on the determination.*

36. *The terminal adapter of claim 31, wherein the processor is further configured to modify the communication path status table to indicate the secondary communication path should be used after determining that the first communication path is unreliable and after the secondary communication path is configured.*

37. *The terminal adapter of claim 36, wherein the processor is further configured to modify the communication path* status table to indicate the first communication path should be used, the modifying occurring in response to a determination that the first communication path is restored.

38. The terminal adapter of claim 37, wherein the processor is further configured to terminate the secondary communication path after modifying the communication path status table to indicate the first communication path should be used determining that the first communication path is restored.

39. The terminal adapter of claim 31, wherein the processor is further configured to switch back to the first communication path from the secondary communication path upon determining that the first communication path is restored.

\* \* \* \* \*